(12) United States Patent
Karwath et al.

(10) Patent No.: US 9,768,649 B2
(45) Date of Patent: Sep. 19, 2017

(54) SINGLE-PHASE ELECTRIC MOTOR

(71) Applicant: EBM-PAPST ST. GEORGEN GmbH & Co. KG, St. Georgen (DE)

(72) Inventors: Arno Karwath, Deisslingen (DE); Bjoern Winter, St. Georgen (DE)

(73) Assignee: EBM-PAPST ST. GEORGEN GmBH & Co. KG, St. Georgen (DE)

( * ) Notice: Subject to any disclaimer, the term of this patent is extended or adjusted under 35 U.S.C. 154(b) by 0 days.

(21) Appl. No.: 14/772,381

(22) PCT Filed: Feb. 27, 2014

(86) PCT No.: PCT/EP2014/053817
§ 371 (c)(1),
(2) Date: Sep. 2, 2015

(87) PCT Pub. No.: WO2014/135434
PCT Pub. Date: Sep. 12, 2014

(65) Prior Publication Data
US 2016/0013686 A1    Jan. 14, 2016

(30) Foreign Application Priority Data
Mar. 4, 2013   (DE) .................. 10 2013 102 124

(51) Int. Cl.
*H02P 1/42*      (2006.01)
*H02K 1/06*      (2006.01)
(Continued)

(52) U.S. Cl.
CPC ............... *H02K 1/06* (2013.01); *H02K 1/27* (2013.01); *H02K 3/28* (2013.01); *H02K 21/22* (2013.01);
(Continued)

(58) Field of Classification Search
CPC ............... H02P 6/26; H02P 25/04; H02P 1/22
(Continued)

(56) References Cited

U.S. PATENT DOCUMENTS 3,229,180 A * 1/1966 Neyhouse .............. H02K 17/06
                                                        318/781
3,995,203 A   11/1976 Torok ........................... 318/166
(Continued)

FOREIGN PATENT DOCUMENTS

CN        1227010 A     8/1999
DE        2515133 A     3/1980
(Continued)

OTHER PUBLICATIONS

Stoelting & Kallenbach, Handbuch Elek.Kleinantriebe [Handbook], Carl Hanser Verlag 2002, pp. 117-136; ISBN 3-446-21985-4.
(Continued)

*Primary Examiner* — Bickey Dhakal
(74) *Attorney, Agent, or Firm* — Milton Oliver, Esq.; Oliver Intellectual Property

(57) ABSTRACT

An electric motor (10) has a stator (20) having a number S of stator poles (21, 22, 23, 24, 25, 26); a rotor (40) having a rotor magnet (40'), which rotor magnet (40') has a number R of rotor poles (41, 42, 43, 44, 45, 46), R being equal to S, and the rotor (40) or the stator (20), or both, exhibiting a magnetic asymmetry. The asymmetry facilitates startup. The electric motor has a single-phase winding arrangement (30) with first (11), second (12) and third (13) terminals. Current can be made to flow, selectively, from either the first or the second terminal, through certain coils, to the third terminal (13). There is an output stage (50), preferably an H-bridge. The W total coils comprise a plurality of subgroups (TG1, TG2) of coils. A method for current flow through an electric motor utilizes these sub-groups (TG1, TG2) for current flow.

23 Claims, 14 Drawing Sheets

(51) Int. Cl.

| | | |
|---|---|---|
| *H02P 6/20* | (2016.01) | |
| *H02K 3/28* | (2006.01) | |
| *H02P 1/46* | (2006.01) | |
| *H02P 6/22* | (2006.01) | |
| *H02P 25/18* | (2006.01) | |
| *H02K 21/22* | (2006.01) | |
| *H02K 29/00* | (2006.01) | |
| *H02K 1/27* | (2006.01) | |
| *H02P 31/00* | (2006.01) | |

(52) U.S. Cl.
CPC .............. *H02K 29/00* (2013.01); *H02P 1/46* (2013.01); *H02P 6/20* (2013.01); *H02P 6/22* (2013.01); *H02P 25/18* (2013.01); *H02P 31/00* (2013.01); *H02K 2213/03* (2013.01); *H02K 2213/09* (2013.01)

(58) Field of Classification Search
USPC ........................................................ 318/784
See application file for complete search history.

(56) References Cited

U.S. PATENT DOCUMENTS

| | | | | |
|---|---|---|---|---|
| 4,348,605 A | * | 9/1982 | Torok ................... | H02K 19/24 310/101 |
| 4,678,972 A | * | 7/1987 | Lehnhoff ................. | H02P 6/26 318/136 |
| 4,730,136 A | | 3/1988 | Mueller ....................... | 310/68 R |
| 5,109,171 A | | 4/1992 | Schmider ........................ | 310/51 |
| 5,294,856 A | * | 3/1994 | Horst ..................... | H02K 1/246 310/168 |
| 5,852,334 A | | 12/1998 | Pengov ........................ | 310/168 |
| 6,140,729 A | | 10/2000 | Pollock et al. | |
| 6,262,510 B1 | | 7/2001 | Lungu ........................... | 310/254 |
| 6,534,946 B2 | | 3/2003 | Lelkes .......................... | 318/685 |
| 7,420,307 B2 | | 9/2008 | Lelkes .......................... | 310/180 |
| 8,847,522 B2 | | 9/2014 | Nashiki ..................... | 318/254.1 |
| 8,922,153 B2 | | 12/2014 | Nashiki ........................ | 318/701 |
| 2004/0239209 A1 | * | 12/2004 | Lefley .................. | H02K 1/246 310/269 |

FOREIGN PATENT DOCUMENTS

| | | |
|---|---|---|
| DE | 30 10 318 | 10/1980 |
| DE | 38 04 549 A | 8/1988 |
| DE | 691-20467 T2 | 11/1991 |
| DE | 102004-053907 | 5/2006 |
| DE | 102005-035451 B | 12/2006 |
| DE | 102006-012554 A | 9/2007 |
| DE | 102009-044528 | 2/2010 |
| EP | 1094595 A2 | 4/2001 |
| EP | 1094595 A3 | 11/2002 |
| JP | DE 102005035451 B3 * | 12/2006 .............. H02K 1/146 |
| WO | 96-09-683 A | 3/1996 |

OTHER PUBLICATIONS

Stoelting et al, Handbook of Fractional-Horsepower Drives, 2008, Springer, ISBN 978-354-073-1283 (English version of German original).

Wikipedia, "Insulated Gate Bipolar Transistors," retrieved Sep. 3, 2015, 4 pp.

* cited by examiner

SINGLE-PHASE ELECTRIC MOTOR

This application is a section 371 of PCT/EP2014/053817 filed 2014 Feb. 27.

FIELD OF THE INVENTION

The invention relates to a single-phase electric motor.

BACKGROUND

In three-phase motors having a stator and a rotor, the ratio between stator poles and rotor poles is always unequal. For example, a three-phase motor having six stator poles that are arranged at a spacing of 60° from one another, and has four rotor poles that are arranged at a spacing of 90° from one another. Each of the three phases here has two mutually oppositely located stator poles associated with it. The result is that, in any rotor position, it is possible to generate a torque via at least two of the three phases, since a magnetically different position of the rotor poles is located opposite each of the three phases. It is thus possible to start the motor with high torque in any rotor position.

With single-phase motors, the number of rotor poles corresponds to the number of stator poles. The consequence of this is that whenever each rotor pole is located opposite exactly one stator pole, no torque can be generated by a flow of current through the winding arrangement. In addition, for example in fans, the rotor preferentially assumes precisely that position when stopped, since it corresponds to the lowest-energy state.

Several methods are already known for enabling starting of such a motor, despite this. DE 8 702 271 U1, corresponding to SCHIMIDER U.S. Pat. No. 5,109,171, describes an electric motor in which soft magnetic iron plates are mounted on the rotor in such a way that in the zero-current-flow state, it assumes a position from which starting is possible. This is also referred to as generating an "auxiliary reluctance torque."

DE 3 149 766 A1, corresponding to MUELLER U.S. Pat. No. 4,730,136, describes an electric motor in which the stator poles are implemented asymmetrically, so that the spacing between the stator poles and the rotor decreases as viewed in a circumferential direction. The rotor poles of the rotor magnet preferentially assume a position in which they are on average as close as possible to the stator pole. This once again results, in the zero-current-flow state, in a starting position from which the motor can begin to operate. Millions of such motors are used in CD players and hard drives.

The aforesaid approaches require a motor in which the external torque and the friction that occur are not too great, as is the case e.g. with fans. Otherwise there is no guarantee that the starting position can reliably be assumed. The area of application for these approaches is thus limited.

SUMMARY OF THE INVENTION

An object of the invention is to furnish a novel single-phase motor.

The object is achieved by an electric motor that comprises: a stator having a number S of stator poles, a rotor having a rotor magnet, which rotor magnet has a number R of rotor poles, R being equal to S, and the rotor or the stator or both exhibiting an asymmetry; a single-phase winding arrangement having a first winding terminal and a second winding terminal, current being capable of flowing through a number W of coils of the winding arrangement via the first winding terminal and the second winding terminal; an output stage that is implemented to enable a current between the first winding terminal and the second winding terminal; a first apparatus that is implemented to enable, in interaction with the output stage, a current flow through at least one sub-group of the W coils, the at least one sub-group encompassing more than none of the W coils and fewer than W of the W coils.

The asymmetry is preferably implemented to make possible, at any rotor position of the rotor, the generation of a torque via at least one of the following current-flow processes:
  current flow through all W coils, or
  current flow through the at least one sub-group of the coils.

Preferably at least two sub-groups are provided.

Preferably the first apparatus comprises a third winding terminal and a switch in order to enable a current between the first winding terminal or the second winding terminal on the one hand, and the third winding terminal on the other hand.

Preferably the number of coils between the first winding terminal and the third winding terminal is not equal to the number of coils between the third winding terminal and the second winding terminal.

Preferably the winding arrangement comprises a plurality of mutually parallel sub-strands, and the first apparatus comprises a switch that is implemented, in the nonconducting state, to prevent a current through a first portion of the sub-strands but not to prevent a current through the remaining sub-strands.

Preferably the rotor exhibits an asymmetry that is generated by the fact that the R rotor poles have, at least in part, an angular extent different from one another.

Preferably the rotor exhibits an asymmetry that is generated by the fact that the angular distance of the magnetic center of one rotor pole from the magnetic center of an adjacent rotor pole is, at least in part, not equal to 360°/R.

Preferably the rotor exhibits an asymmetry that is generated by an asymmetrical magnetization of the rotor magnet.

Preferably the rotor exhibits an asymmetry that is achieved by an asymmetrical arrangement of different materials in the region of the rotor, the different materials having different magnetic properties.

Preferably the stator exhibits an asymmetry that is generated by the fact that the angular distance of the adjacent stator poles is, at least in part, not equal to 360°/S, where preferably S=2.

Preferably the at least one sub-group encompasses at least one of the W coils and at most W−1 coils.

Preferably W=S.

Preferably the output stage comprises a full bridge circuit in order to enable a current flow through the winding arrangement between the first winding terminal and the second winding terminal in both directions.

Preferably the rotor magnet comprises permanent-magnet rotor poles or electromagnetically generated rotor poles; in the case of the electromagnetically generated rotor poles, each rotor pole having, associated with it, a winding through which current flows during operation.

The object is achieved by a method for current flow through an electric motor having a stator having S stator poles, a rotor having R rotor poles, R being equal to S; having a single-phase winding arrangement having a first winding terminal and a second winding terminal, W coils being electrically connected between the first winding terminal and the second winding terminal; having an output stage that is implemented to enable a current between the first winding terminal and the second winding terminal; having a first apparatus that is implemented to enable, in interaction with the output stage, a current flow through at least one sub-group of the W coils, the at least one sub-group encompassing more than none of the W coils and fewer than W of the W coils; which method comprises the following steps:

A) with the electric motor in a first state, the output stage is controlled in such a way that current flows through all W coils via the first winding terminal and the second winding terminal;

B) with the electric motor in a second state, the output stage is controlled in such a way that current flows through only the at least one sub-group of the W coils.

Preferably the rotation speed of the electric motor is sensed, and a switchover occurs from the first state of the electric motor into the second state when the rotation speed of the electric motor is below a predetermined minimum rotation speed.

Preferably a switchover into the second state occurs upon starting of the motor, and then a switchover into the first state occurs.

Preferably in the first state the direction of the current flow between the first winding terminal and the second winding terminal is predetermined as a function of the rotor position of the rotor.

Further details and advantageous refinements of the invention are evident from the exemplifying embodiments, in no way to be understood as a limitation of the invention, that are described below and depicted in the drawings.

BRIEF FIGURE DESCRIPTION

FIG. 1 schematically depicts a single-phase electric motor 10 having six stator poles;

DETAILED DESCRIPTION

Figure 1:
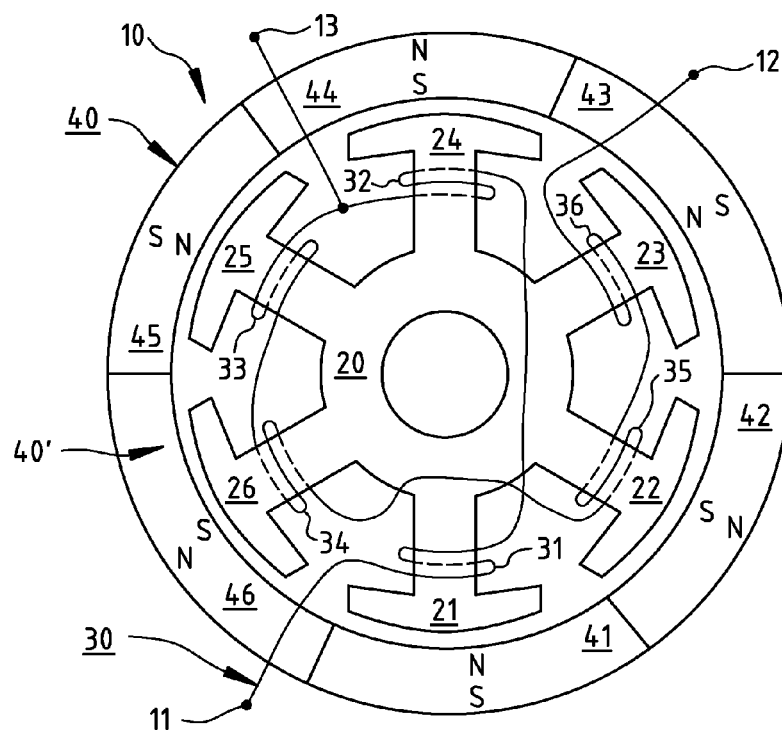

FIG. 1 shows an electric motor 10 having a stator 20 and a rotor 40. Stator 20 has a winding arrangement 30 associated with it, and it has six stator poles 21 to 26. Rotor 40 has a rotor magnet 40' likewise having six rotor poles 41 to 46 that are preferably implemented as permanent-magnet rotor poles 41 to 46.

Winding arrangement 30 has six coils 31 to 36, connected in series, that are connected or electrically joined in series between a first winding terminal 11 and a second winding terminal 12. Each stator pole 21 to 26 has one of coils 31 to 36 associated with it; coils 31 to 36 are wound in such a way that when current flows, a North pole is followed by a South pole, then a North pole again, etc. alternatingly in the respective adjacent stator poles 21 to 26, since the rotor poles 41 to 46 can also respectively change direction. Winding arrangement 30 begins—proceeding from first winding terminal 11—at stator pole 21, proceeds therefrom to stator pole 24 and then to stator poles 25, 26, 22, and 23, and from there to second winding terminal 12. Current can thus flow through coils 31 to 36 via first winding terminal 11 and second winding terminal 12.

A third winding terminal 13, which can also be referred to as a "tap," is provided on winding arrangement 30 between stator poles 24 and 25.

Figure 2:
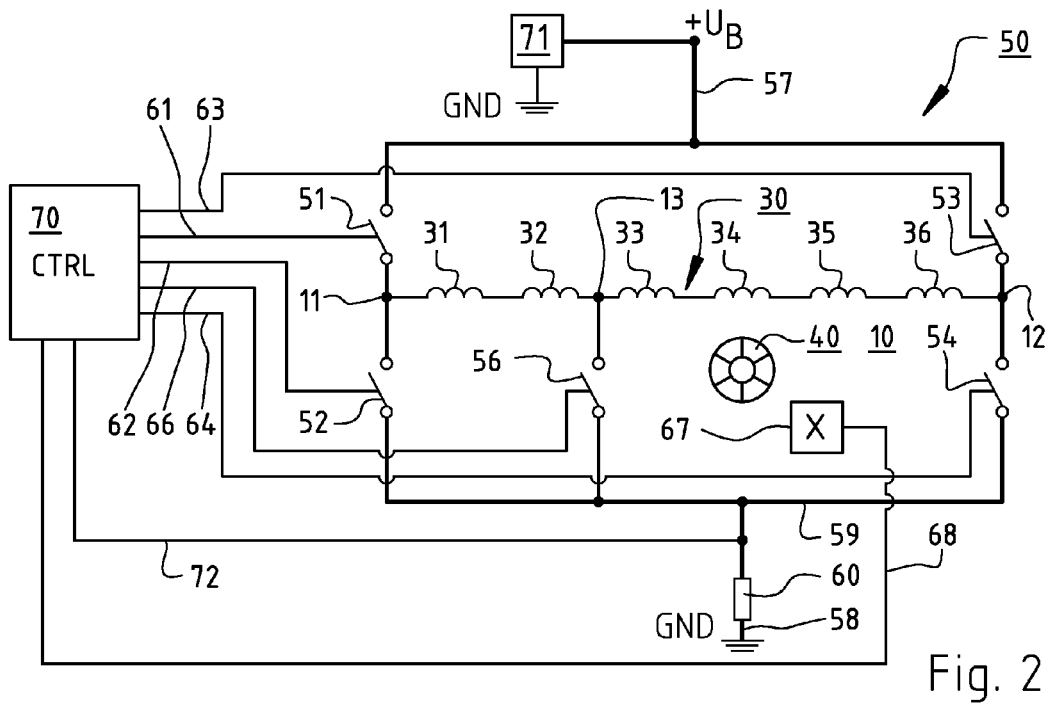
FIG. 2 is a circuit diagram of a circuit for operating motor 10 of FIG. 1.

FIG. 2 shows a corresponding circuit diagram for motor 10 of FIG. 1. It depicts winding arrangement 30 having the six coils 31 to 36 and having first winding terminal 11, second winding terminal 12, and third winding terminal 13, as well as a control apparatus 70 and an output stage 50 for influencing the current through winding arrangement 30.

A first lead 57 (+$U_B$) and a second lead 58 (GND or reference potential) are provided in order to deliver a supply voltage +$U_B$ to output stage 50, for example from a DC voltage source 71.

A switch 51 is provided between first lead 57 and first winding terminal 11, and a switch 52 is provided between first winding terminal 11 and second lead 58.

A switch 53 is provided between first lead 57 and second winding terminal 12, and a switch 54 is provided between second winding terminal 12 and second lead 58.

The arrangement having the four switches 51, 52, 53, and 54 is also referred to as a "full bridge circuit" or "H bridge," in which winding arrangement 30 constitutes the bridge arm of the full bridge circuit.

A switch 56 is provided between third winding terminal 13 and second lead 58.

Lead 58 is connected via a so-called "base resistor" 60 to a lead 59, and switches 52, 54, 56 are correspondingly connected via lead 59 indirectly to lead 58. Resistor 60 is usually low-impedance, and it can additionally or alternatively be provided in lead 57, or can be omitted entirely.

A control apparatus 70 has five control leads 61, 62, 63, 64, and 66 through which it is connected to the five switches 51 to 54 and 56 in order to render them conductive or non-conductive.

Figure 6:
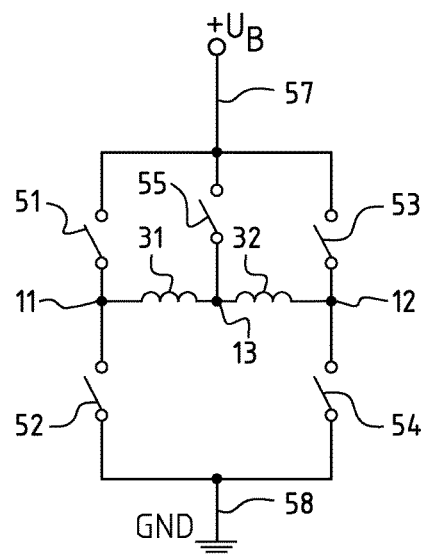
FIG. 6 shows an output stage for motor 10 of FIG. 1 having two coils.
Figure 7:
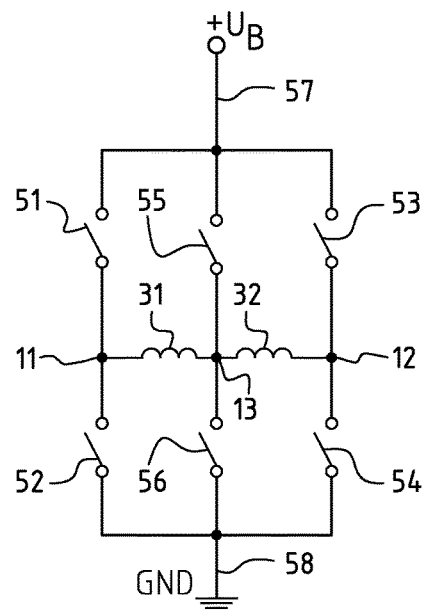
FIG. 7 shows an output stage for motor 10 of FIG. 1 having two coils.

Unless otherwise indicated, switches 51, 52, 53, 54, 56, and 55 that are used are preferably controllable switches, more preferably semiconductor switches such as MOSFETs, IGBTs (isolated gate bipolar transistors), or bipolar transistors (see FIG. 6 and FIG. 7). Relays, for example, can also be used for switches 55, 56.

The upper switches 51, 53, 55 are also referred to as "high side" switches, and the lower switches 52, 54, 56 as "low side" switches.

Switches 51 to 56 preferably each have a freewheeling diode associated with them (see FIG. 26) in order to prevent a current through the switches in the reverse direction, as can occur e.g. as a result of the induced voltage when switches 51 to 56 are non-conductive and rotor 40 is rotating. Alternatively, a freewheeling diode can also be provided only on switches 51, 52, 53, 54, and switch 56 can be without a freewheeling diode, since the current flow through switch 56 can be limited to the starting operation so that a large induced voltage does not yet occur.

A rotor position sensor 67 (e.g. Hall sensor or magnetoresistive [MR] sensor or encoder) is preferably arranged on rotor 40, in order to identify the rotor position, and rotor position sensor 67 is connected via a lead 68 to control apparatus 70.

Control apparatus 70 is connected via a lead 72 to lead 59 in order to measure the potential at base resistor 60.

Operation

In normal operation, i.e. when rotor 40 is rotating and preferably has reached a minimum rotation speed, current flows through winding arrangement 30 via full bridge circuit 51, 52, 53, 54.

This is done, for example, by alternatingly either, in a first state Z1, rendering switches 51 and 54 conductive or, in a second state Z2, rendering switches 53 and 52 conductive.

In the first state Z1, a current flows from first lead 57 through switch 51, winding terminal 11, winding arrangement 30, second winding terminal 12, switch 54, lead 59, and base resistor 60 to second lead 58.

In the second state Z2, the current flows from operating voltage 57 through switch 53, second winding terminal 12, winding arrangement 30, first winding terminal 11, switch 52, lead 59, and base resistor 60 to ground 58.

In the first state Z1 and second state Z2, the remaining switches are non-conductive.

Operation switches back and forth between the first state Z1 and the second state Z2, depending on the rotor position of rotor 40, so as thereby to drive rotor 40. The rotor position is sensed via rotor position sensor 67. Sensing can also occur, however, in sensorless fashion.

The control procedure described above for normal current flow through output stage 50 during operation is an example, and one skilled in the art knows of a plurality of control options for output stages, i.e. including, for example, clock-timed application of control to at least some of switches 51 to 54, or block commutation.

Base resistor 60 serves to measure the current through output stage 50 so that control apparatus 70 can detect an overcurrent via lead 72.

Control apparatus 70 controls switches 51 to 53 in order to drive, or optionally also to decelerate, motor 10. Closed- or open-loop control of rotation speed, power output, etc. is possible here, for example.

Because commutation is effected via switches (here 51 to 54) and not via commutator brushes, the motor is also referred to as a "brushless" or "electronically commutated" motor.

Starting the Motor

When motor 10 of FIG. 2 starts, it is possible for rotor 40 to be in an unfavorable rotor position, in which a current flow, through winding arrangement 30 via switches 51, 54 or 53, 52, generates very little or no torque.

Via third winding terminal 13, it is possible to make switches 51 and 56 conductive in a third state Z3, so that a current flows from first lead 57 through switch 51, first winding terminal 11, coils 31 and 32, third winding terminal 13, switch 56, lead 59, base resistor 60 to second lead 58. Current thus flows through a first sub-group TG1 of coils 31 to 36 that encompasses only coils 31 and 32.

It is likewise possible to make switches 53 and 56 conductive in a fourth state Z4, so that a current flows from first lead 57 through switch 53, second winding terminal 12, coils 36, 35, 34, 33, third winding terminal 13, switch 56, lead 59, base resistor 60 to second lead 58. Current thus flows through a second sub-group TG2 of coils 31 to 36 that encompasses only coils 33 and 36.

In this exemplifying embodiment, no coils are therefore contained in common in sub-groups TG1, TG2, but instead current flows through different coils in each case.

The expression for the magnetic (internal) torque $M\_i$ of motor 10 is $$M\_i = k\_m I \qquad (1)$$

where
$k\_m$=torque constant (also called "flux linkage")
I=winding current through winding 30

For the actual torque or output torque M, the negatively acting frictional torque $M\_R$ must also be taken into account.

The expression for the voltage $U\_i$ induced in winding arrangement 30 is $$U\_i = k\_m \, \text{omega} = k\_m 2 pi n/60 \qquad (2)$$

where
omega=ω=angular speed
n=rotation speed in $\text{min}^{-1}$

When the output stage is blocked or output stage transistors 51, 52, 53, 54, 56 are nonconductive, the voltage U applied to winding terminals 11, 12 (armature voltage) becomes $$U = IR + U\_i \qquad (3)$$

where
R=resistance of winding arrangement 30.

The torque constant $k\_m$ is a function of the rotor position phi of rotor 40, i.e. $k\_m = k\_m(\text{phi})$. The voltage constant kE, which is proportional to k_m and is sometimes also referred to as Ke, is often also considered instead of the torque constant k_m.

As is evident from equations (1) and (2), the torque constant k_m creates both the proportionality between the torque M_i and the winding current I and the proportionality between the induced voltage U_i and the angular speed omega. It is therefore possible, for example, to ascertain the torque constant k_m by externally driving rotor 40 at a constant angular speed omega and simultaneously measuring the induced voltage U_i, and the profile of the resulting curve is proportional or identical to the curve for the magnetic torque M_i.

Figure 3:
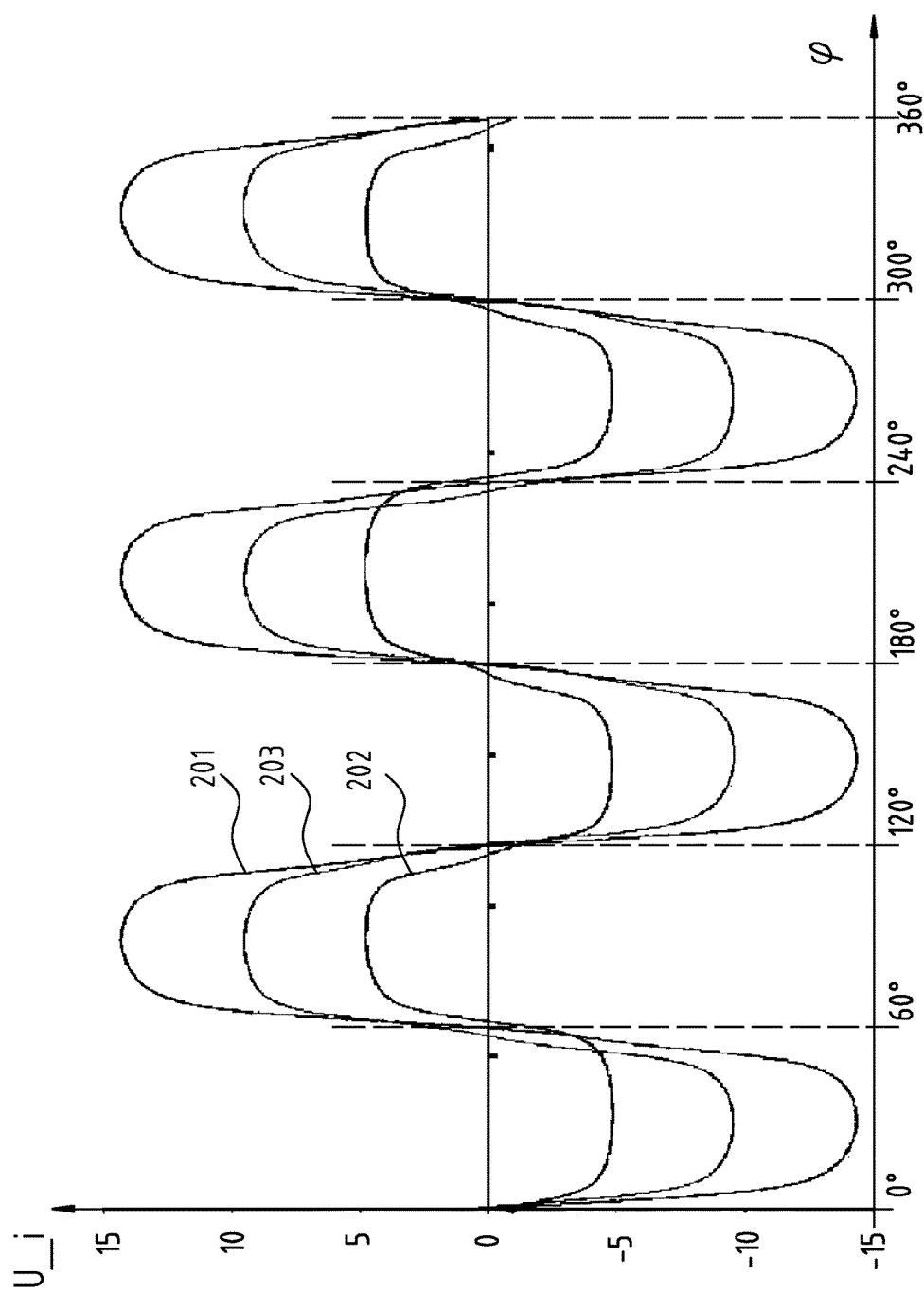
FIG. 3 shows a measurement of the induced voltage of motor 10 of FIG. 1.

FIG. 3 shows a measurement of the induced voltage M_i over one full revolution of rotor 40 from phi=0 to 360°.

Curve 201 shows the induced voltage U_i that is measured between first winding terminal 11 and second terminal 12. It is apparent that curve 201 has six zero crossings; and if the motor comes to rest in a rotor position at which curve 201 exhibits a zero crossing, then no torque can be generated by a current flow between first winding terminal 11 and second winding terminal 12.

Curve 202 shows the induced voltage U_i that is induced between first winding terminal 11 and third winding terminal 13 in coils 31, 32 (sub-group TG1). Curve 202 has a lower amplitude than curve 201, since what is added is only the signal from the two coils 31, 32 rather than the signal of all six coils 31 to 36, as in curve 201. It is evident that the zero crossings of curve 202 occur at different rotor positions than the zero crossings of curve 201.

Curve 203 shows the induced voltage U_i that is induced between second winding terminal 12 and third winding terminal 13 in coils 33 to 36 (sub-group TG2). Curve 203 has a lower amplitude than curve 201 and a higher amplitude than curve 202, since the signal of the four coils 33 to 36 is added. It is evident that the zero crossings of curve 203 occur at different rotor positions than the zero crossings of curves 201 and 202.

Figure 4:
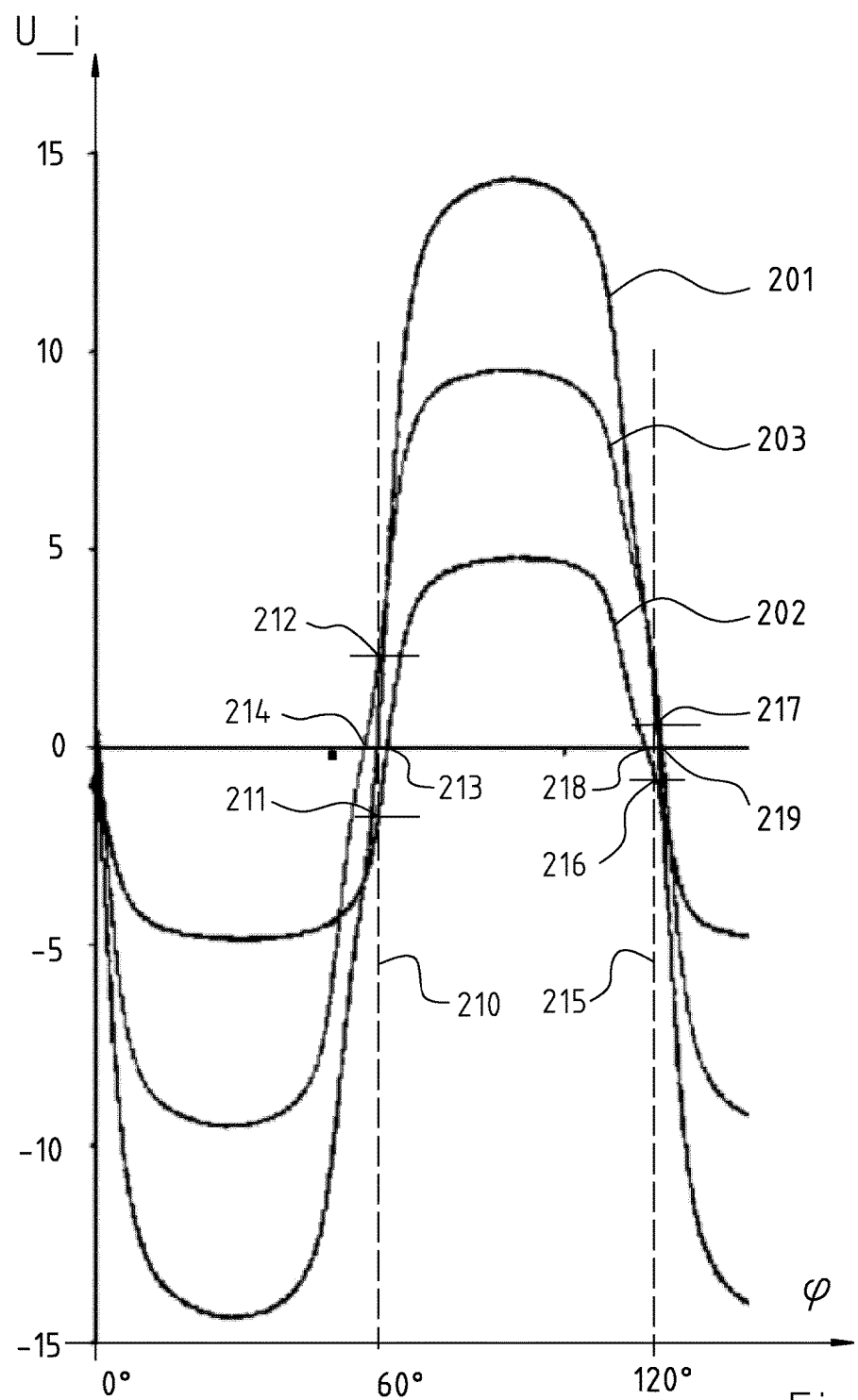
FIG. 4 is a detail view of FIG. 3.

FIG. 4 shows a portion of FIG. 3 for the angle range from 0° to approximately 150°.

Curve 201, which reproduces the induced voltage U_i between first winding terminal 11 and second winding terminal 12, has a zero crossing at 60°, the angle of 60° being characterized by vertical line 210 and the zero crossing at 120° being characterized by vertical line 215. At points 210 and 215, no torque can be generated by a current flow between winding terminals 11 and 12 because the curve for the torque constant k_m corresponds to the curve for the induced voltage U_i, and both of them have a zero crossing.

Curve 202, however, has its zero crossing at a point 213 (at approximately 62°) located after point 210, and at point 210 curve 202 still has a negative value that is characterized as horizontal line 211.

Curve 203 has its zero crossing before point 210, at point 214 (at approximately 57°), and at point 210 curve 203 has already risen into the positive region, the value being characterized by a horizontal line 212.

Because curves 202, 203 are different from zero at point 210, a torque can be generated there either via coils 31, 32 associated with curve 202 (sub-group TG1) or via coils 33 to 36 associated with curve 203 (sub-group TG2).

At point 215, which corresponds to a rotor position of 120°, curve 202 has already had a zero crossing at a smaller angle (at point 218) and has dropped to a negative value that is characterized by a horizontal line 216.

Curve 203 has its zero crossing just after point 215 at point 219, and curve 203 is slightly in the positive region at point 215.

As is evident, the torque achievable via curves 202, 203 at point 215 is less than at point 210, and a greater torque can be generated by a current flow through coils 31, 32 associated with curve 202 than via coils 33 to 36 associated with curve 203.

At the zero crossings 213, 218 of curve 202, the other curves 201, 203 are respectively positive and negative, and at the zero crossings 214, 219 of curve 203 the other curves 201, 202 are respectively positive and negative, i.e. not equal to zero.

The result is that a torque can be generated at any rotor position phi.

Now that the fundamental principle has been presented, details and variants will be discussed below.

Motor Type

The approach presented, with which a torque can be generated at any rotor position, is in principle independent of motor type. Internal-rotor, external-rotor, or disk-armature motors, for example, can be used.

Stator 20 can comprise a stator core as shown, for example, in FIG. 1, but it can also be configured without a stator core; this is also referred to as an "air-core" winding. The stator core is preferably implemented as a stator stack or stator lamination stack, but other variants are also possible.

The number of S of stator poles 21, 22 is preferably even, and S=2, 4, 6, 8, . . . or 2*N where N=1, 2, 3, . . . .

The number R of rotor poles 41, 42 preferably corresponds to the number S of stator poles 21, 22, etc.

Figure 28:
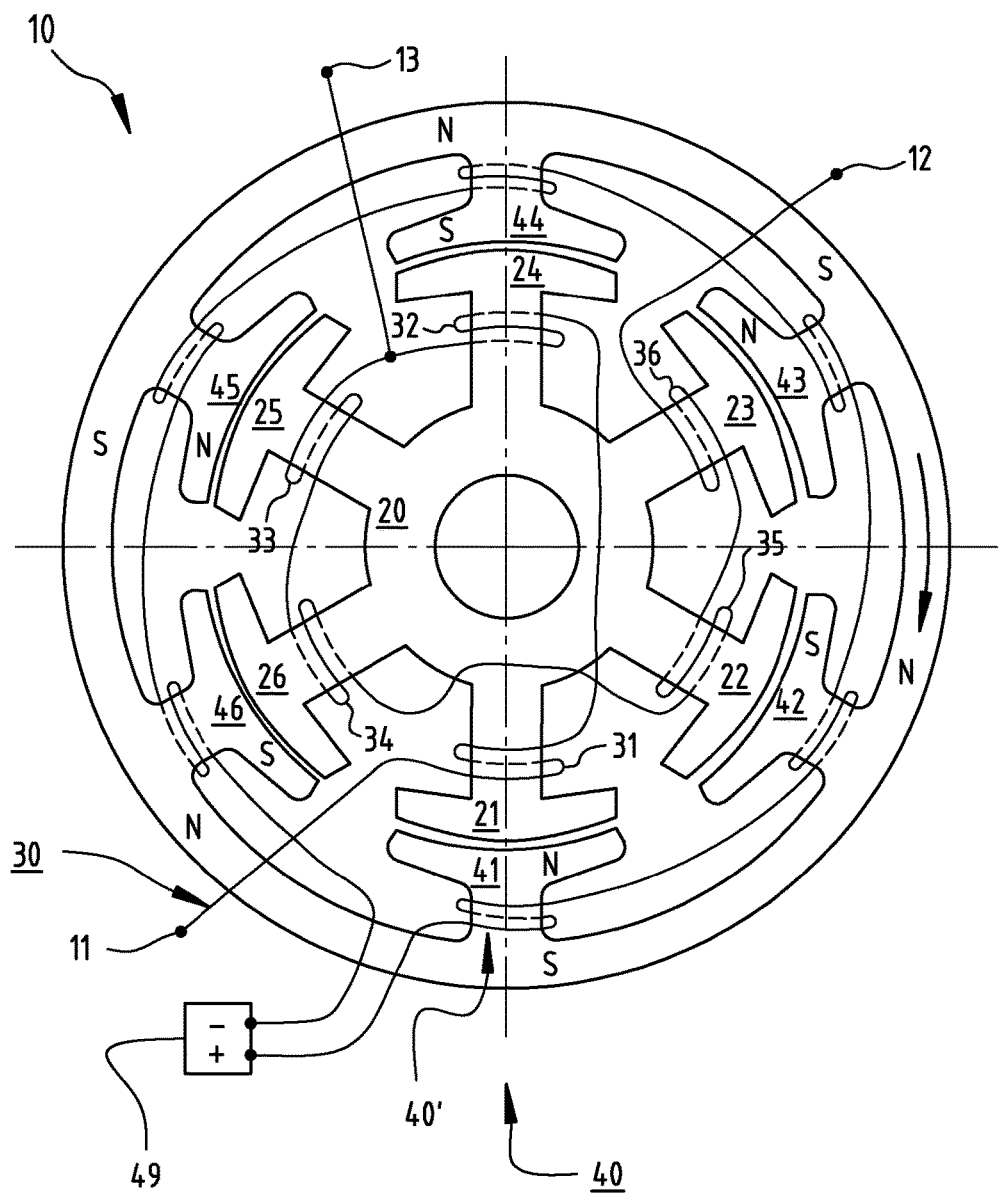
FIG. 28 shows an electromagnetically generated rotor magnet.

Rotor 40 is preferably a permanent-magnet rotor 40 having permanent-magnet rotor poles 41, 42, etc., or a permanent-magnet rotor magnet 40'. It is also possible, however, to use, for example, a motor having electromagnetically generated rotor poles 41, 42, etc., in which e.g. each rotor pole 41, 42, etc. comprises a winding, depicted in FIG. 28, through which current flows during operation; current flow occurs as a result of a voltage source 49, and the winding is wound, for example, around a lamination stack. Voltage source 49 can be arranged on rotor 40 but need not obligatorily be arranged in rotor 40. In the case of an external arrangement, an electrical connection can be effected e.g. via wiper contacts or other contacts that enable electrical conduction despite the rotational motion of the rotor. Current flows in rotor 40 preferably in such a way that rotor magnets 41, 42, etc. always generate a magnetic field in the same direction during operation, so that they can be used like permanent-magnet rotor magnets 41, 42, etc.

In the exemplifying embodiment of FIG. 1, stator 20 has six slots into which the winding arrangement is distributed. This is therefore referred to as a "six-slot" or "six-pole" motor.

Winding Arrangement and Wiring Configuration for Partial Current Flow Through the Coils FIG. 5 to FIG. 7 and FIG. 26 show a variety of variants for wiring a single-phase, single-strand motor having two poles. The two coils 31, 32 have first winding terminal 11 and second winding terminal 12. First winding terminal 11 is connected via switch 51 to first lead 57, and via switch 52 to second lead 58. Second winding terminal 12 is connected via switch 53 to first lead 57 and via switch 54 to second lead 58; switches 51 to 54 form a full bridge circuit. Third winding terminal 13 is arranged between coils 31, 32.

Figure 5:
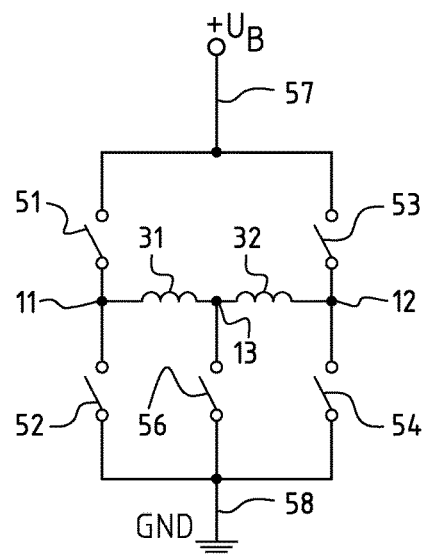
FIG. 5 shows an output stage for motor 10 of FIG. 1 having two coils.

In FIG. 5, third winding terminal 13 is connected via switch 56 to second lead 58. With the aid of switch 56, a current can flow through switch 51, coil 31 (sub-group TG1), and switch 56, or a current can flow through switch 53, coil 32 (sub-group TG2), and switch 56. The arrangement of switch 56 leading to lead 58 has the advantage that corresponding semiconductor switches and driver circuits are often more inexpensive than for switches that are used between first lead 57 and a winding terminal 11, 12, 13.

In FIG. 6, third winding terminal 13 is connected via a switch 55 to first lead 57. With the aid of switch 55, a current can flow through switch 55, coil 31 (sub-group TG1), and switch 52, or a current flows through switch 55, coil 32 (sub-group TG2), and switch 54.

In FIG. 7, third winding terminal 13 is connected both via switch 55 to operating voltage 57 and via switch 56 to ground 58. This makes possible a current flow individually through coils 31, 32 in both directions. This can be necessary, for example, when the application permits absolutely no rotation in the wrong direction. In cases in which this is noncritical, however, for example in a fan, the use of two switches 55, 56 on second winding terminal 13 results in unnecessary additional cost.

Figure 26:
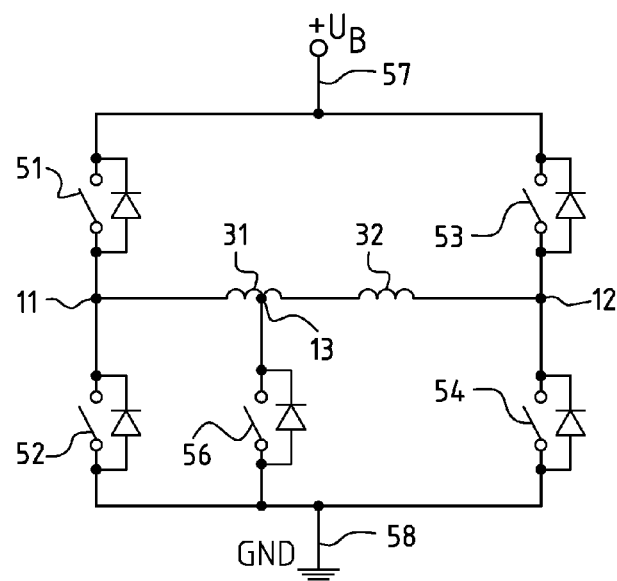
FIG. 26 shows an output stage for motor 10 of FIG. 1 having a winding terminal in the region of a coil.

FIG. 26 corresponds to the circuit of FIG. 5, winding terminal 13 being located not exactly between the two coils 31, 32 but rather inside first coil 31. With all the exemplifying embodiments it is therefore possible in principle also to arrange winding terminal 13 inside a coil 31, 32, and in the present example a current flow between winding terminals 11, 13 allows current to flow through two-thirds of coil 31, and a current flow between winding terminals 13, 12 allows current to flow through one-third of coil 31 and all of coil 32. This yields the following possible sub-groups:
TG1=(⅔ of coil 31)
TG2=(coil 32 and ⅓ of coil 31).

Figure 8:
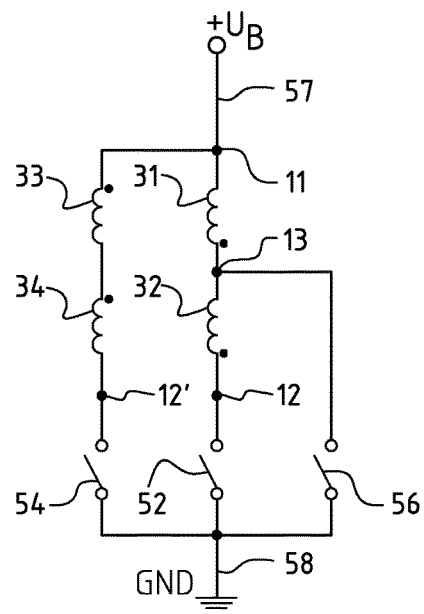
FIG. 8 shows an output stage for motor 10 of FIG. 1 having two strands.

FIG. 8 shows a single-phase, two-strand winding arrangement for a stator having two stator poles, in which a first strand encompasses coils 31, 32 and a second strand encompasses coils 33, 34. Each of the strands can be connected in only one direction from lead 57 (UB) to lead 58 (GND). A current flow through the strand having coils 31, 32 acts exactly oppositely to a current flow through the strand having coils 33, 34, as characterized by the black dots next to coils 31, 32, 33, 34. Coils 31, 32 have winding terminals 11, 12, and coils 33, 34 have winding terminals 11, 12'. Winding terminal 12 is connected via a switch 52 to lead 58 (GND), and winding terminal 12' is connected via a switch 54 to lead 58 (GND). The two strands are preferably configured as a bifilar winding, but can also be wound sequentially.

Arranged between coils 31, 32 of the first strand is a third winding terminal 13 that is connected via a switch 56 to lead 58 (GND) in order to enable a current flow to coil 31 at startup. This yields the following current flow possibilities:
first strand=(coil 31, coil 32)
second strand=(coil 33, coil 34)
sub-group TG1=(coil 31).

During normal operation, i.e. once motor 10 has started up, current flows alternatingly through switches 52 and 54.

An arrangement of this kind having a larger number S of stator poles is of course also possible, for example where S=4, 6, 8, 10, etc.

FIGS. 9 to 12 show (not exhaustively) a variety of variants for wiring a single-phase motor having four poles. The four coils 31 to 34 have a first winding terminal 11 and a second winding terminal 12. Winding terminals 11 and 12 are connected via a full bridge circuit having switches 51, 52, 53, 54 between first lead 57 and second lead 58.

Figure 9:
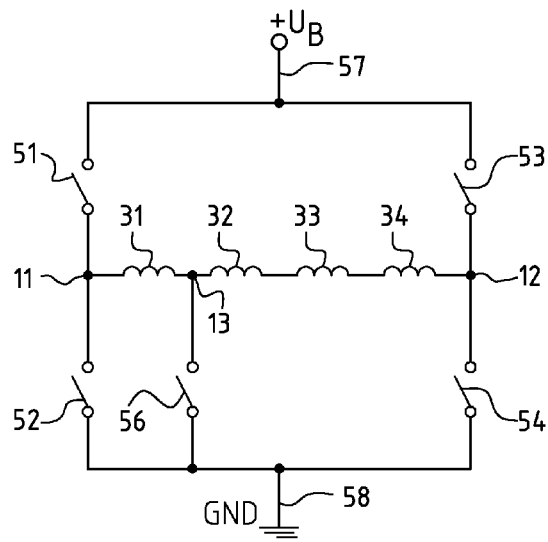
FIG. 9 shows an output stage for motor 10 of FIG. 1 having four coils that are connected in series.
Figure 10:
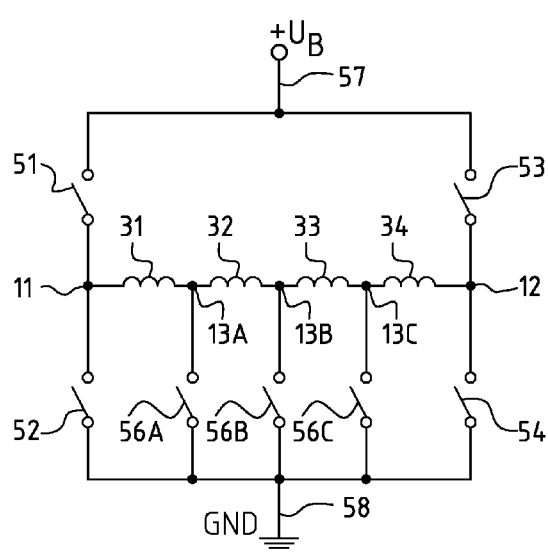
FIG. 10 shows an output stage for motor 10 of FIG. 1 having four coils that are connected in series.

In FIG. 9 and FIG. 10, the four coils 31 to 34 are connected in series.

In FIG. 9, third winding terminal 13 is connectable via switch 56 to second lead 58.

In FIG. 10, a winding terminal 13A is provided between coils 31 and 32, a winding terminal 13B between coils 32 and 33, and a winding terminal 13C between coils 33 and 34. Winding terminals 13A, 13B, and 13C are connectable to second lead 58 via a respective switch 56A, 56B, 56C. The provision of three additional switches 56A, 56B, 56C is more expensive than a variant having only one switch 56, but it makes possible the use of a rotor 40 or rotor magnet 40' having less asymmetry, since specific rotor poles can be more variably influenced via the interconnection pattern. Current flow to the following sub-groups of coils 31 to 36 is possible, for example:
TG1=(31)
TG2=(31, 32)
TG3=(31, 32, 33)
TG4=(34)
TG5=(34, 33)
TG6=(34, 33, 32).

At least some of coils 31 to 36 are present in several of the sub-groups TG1 to TG6.

With this variant it is possible to additionally provide switches 55A, 55B, 55C (not depicted) at winding terminals 13A, 13B, 13C in order to enable an interconnection to first lead 57. The result is that coils 31 to 36 can be controlled with even more variants, and with a winding arrangement wired in this manner the asymmetry in a single rotor pole is sufficient to allow generation of a torque in any rotor position.

Figure 11:
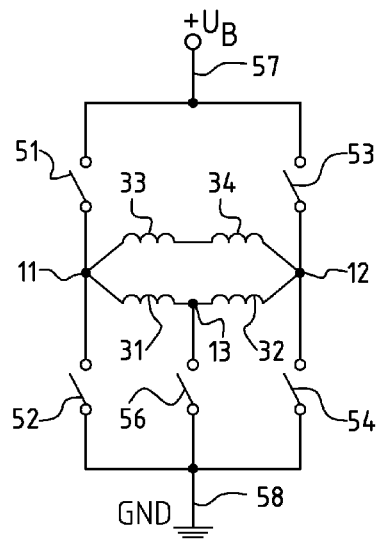
FIG. 11 shows an output stage for motor 10 of FIG. 1 having four coils that are connected in parallel in two arms.
Figure 12:
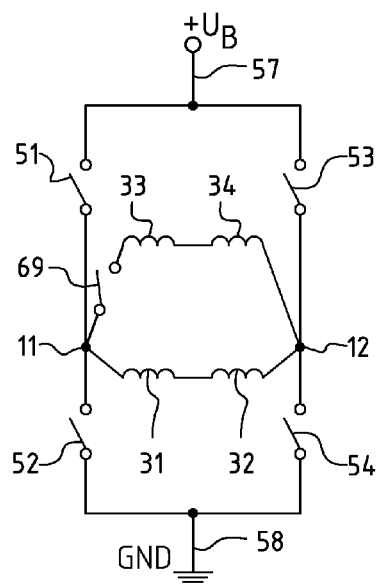
FIG. 12 shows an output stage for motor 10 of FIG. 1 having four coils that are connected in parallel in two arms.

In FIG. 11 and FIG. 12, coils 31 and 32 are connected in series between winding terminals 11, 12, and coils 33, 34 are likewise connected in series between winding terminals 11, 12, so that coils 31, 32 are connected in parallel with coils 33, 34.

In FIG. 11, third winding terminal 13 is provided between coils 31, 32 and said terminal is connectable via switch 56 to second lead 58. The result is that at startup, current can flow through one of coils 31 (sub-group TG1, via switches 51, 56) or 32 (sub-group TG2, via switches 53, 56).

FIG. 12 shows another possibility for effecting current flow through only some of coils 31 to 34. A switch 69 is provided in the sub-strand (arm) having coils 33, 34 between first winding terminal 11 and coil 33, and via this switch 69 the sub-strand having coils 33, 34 can be cut off from the current flow at startup. It is advantageous for such a variant if at least some of the coils are connected in parallel. A sub-group TG1=(31, 32) thus exists. A disadvantage of this approach is that when current is flowing in normal operation via winding terminals 11, 12, a current constantly flows through switch 69. This results in losses, and an expensive switch 69 having low resistance and/or good cooling may be necessary. But because switch 69 is not switched in normal operation, it is possible to use, for example, a relay. Switch 69 can also be arranged between coils 33, 34, or between coil 34 and second winding terminal 12, or in one of coils 33, 34. It is furthermore possible to disconnect winding terminal 11 for the two arms 31, 32 and 33, 34 and to provide a switch 51 and 52 for each winding arm, or else, for example in the context of a winding arrangement having three parallel sub-strands, to implement either only one sub-strand or two sub-strands via switch 69 so they can be shut off. It is also possible to additionally provide a third winding terminal in order to have further possibilities for current flow through sub-groups of the coils.

Generating Asymmetry

With a symmetrical stator 20 and symmetrical rotor 40, no torque can be generated even by current flow through some or through a sub-group of coils 21 to 26, since exactly the same voltage U_i is being induced in each of coils 31 to 36.

An asymmetry must therefore be present either in stator 20 or in rotor 40 or in both, so that the voltages induced in the individual coils 31, 32, etc. in normal operation differ at least in part from one another.

Asymmetry in the Rotor

An asymmetry can be achieved by the fact that the angular extent of at least one of rotor poles 41 to 46 differs from the angular extent of at least one other of rotor poles 41 to 46, i.e. that rotor magnet 40' is implemented asymmetrically. In FIG. 1, for example, rotor poles 41, 44 each have an angular extent of 60°, rotor poles 42, 45 an angular extent of 55°, and rotor poles 43, 46 an angular extent of 65°. With this arrangement, the angular distribution of rotor poles 41, 42, 43 corresponds to angular distribution 44, 45, 46. The advantage of this is that any half of rotor 40 has the same number of North-South or South-North poles on each side. This is positive both for the total torque of motor 10 and for noise emission. It is also positive to select, as in FIG. 1, two oppositely located stator poles 21, 24 for the partial current flow to coils 31 to 36, since these two stator poles 21, 24 and the associated coils 31, 32 "see" the same magnets 41 and 44 in magnetic terms, so that the torque resulting upon current flow through coils 31, 32, in connection with rotor poles 41, 44, adds up.

FIG. 13 to FIG. 16 show examples of various embodiments of four-pole rotors 40 having the four rotor poles 41, 42, 43, and 44.

Figure 13:
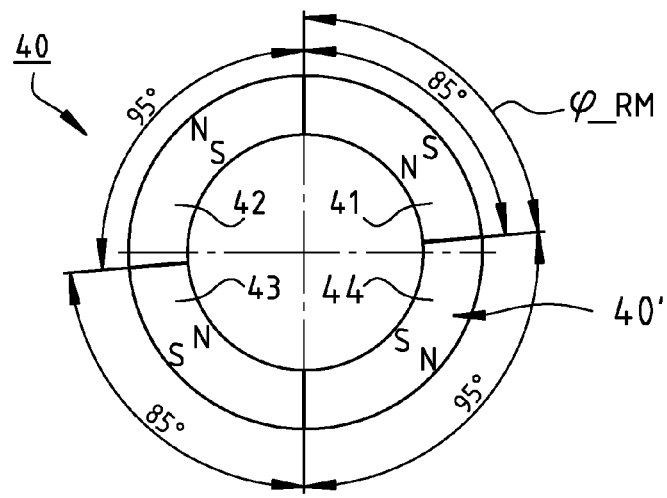
FIG. 13 shows a four-pole rotor of motor 10 of FIG. 1 in which the rotor poles have two different angular extents.

In FIG. 13, rotor poles 41, 43 located opposite one another each have an angular extent phi_RM of 85°, and rotor poles 42, 44 each have an angular extent phi_RM of 95°.

Figure 14:
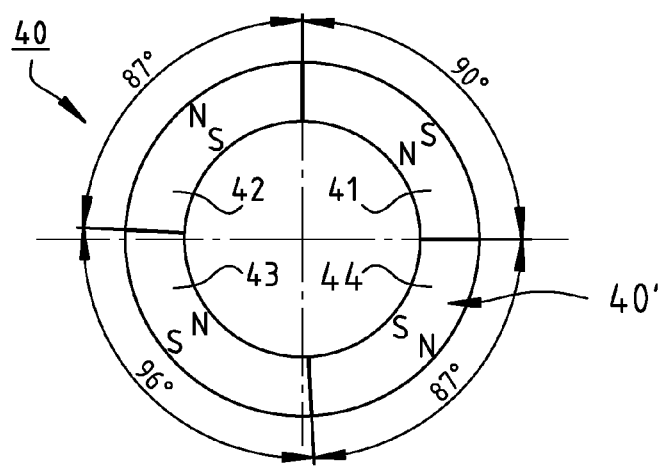
FIG. 14 shows a four-pole rotor of motor 10 of FIG. 1 in which the rotor poles have three different angular extents.

In FIG. 14, rotor pole 41 has an angular extent phi_RM of 90°, rotor poles 42, 44 adjacent thereto have an angular extent phi_RM of 87°, and rotor pole 43 of rotor magnet 40' has an angular extent phi_RM of 96°. The use of three different angular extents phi_RM_in principle offers more possibilities for generating a torque upon startup than with rotor 40 of FIG. 13, and with such a rotor 40 a torque can be generated in any rotor position, even with a symmetrical stator 20, using the simple output stage according to FIG. 9. But because bisecting a rotor 40 of this kind does not result in the same amount of identically magnetized pole material on each half, this can result in a radial tension, which is undesirable. The differences should therefore be as small as possible.

Figure 15:
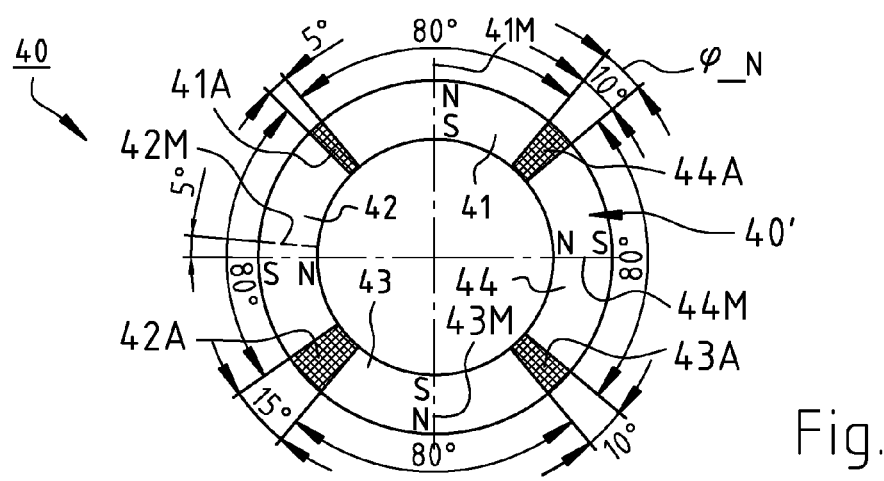
FIG. 15 shows a four-pole rotor 40 in which neutral regions having different angular extents are provided between the rotor poles.

In FIG. 15, rotor poles 41 to 44 of rotor magnet 40' each have the same angular extent phi_RM=80°. In addition, neutral zones 41A to 44A are respectively provided between rotor poles 41 and 44, and thanks to their asymmetry it is also possible to generate an asymmetry of rotor 40 or of rotor magnet 40' that allows the motor to start. For this, intermediate regions 44A (between rotor poles 44 and 41) and 43A (between rotor poles 43 and 44) have an angular extent phi N=10°, intermediate region 41A (between rotor poles 41, 42) has an angular extent phi N=5°, and intermediate region 42A (between rotor poles 42 and 43) has an angular extent phi N=15°. The asymmetry becomes evident when viewing the magnetic centers 41M to 44M of rotor poles 41 to 44. Magnetic centers 41M, 44M, and 43M are each at an angular distance of 90°, or generally 360°/R where R=number of rotor poles, and magnetic center 42M is shifted 5° out of the 90-degree pattern. The result is that the angular distance between magnetic center 41M and magnetic center 42M is 85°, and the angular distance between magnetic centers 42M and 43M is 95°.

Figure 16:
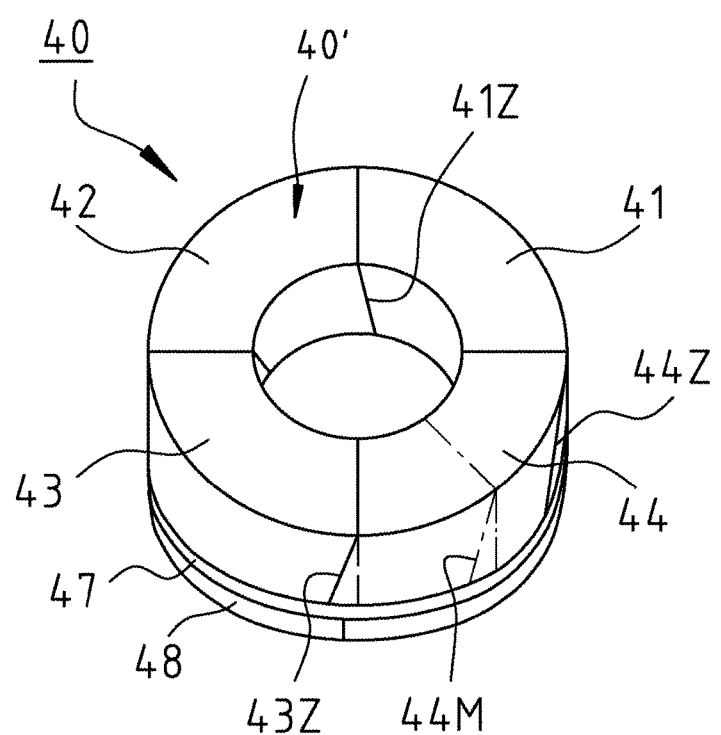
FIG. 16 shows a rotor 40 for motor 10 of FIG. 1 having oblique rotor poles.

FIG. 16 shows a rotor 40 having four poles 41, 42, 43, 44 of rotor magnet 40', a neutral region 47 arranged axially below the poles, and preferably a magnetic track 48 arranged axially below neutral region 47. The pole boundaries between poles 41, 42, 43, and 44 are each oblique; pole boundaries 43Z (between poles 43, 44) and 44Z (between rotor poles 44 and 41) are visible on the peripheral side of rotor magnet 40', and the oblique pole boundary 41Z between rotor poles 41 and 42 is visible on the inner side of rotor 40. With this configuration as well, it is helpful to look at the magnetic center, which is drawn in for rotor pole 44, for example, as 44M.

The additional magnetic track 48, which can be arranged in a variety of ways relative to poles 41 to 44, serves to generate a sensor magnetic field suitable for the rotor position sensors in order to enable good commutation. This is especially important when poles 41 to 44 have different angular extents (see description of FIG. 23).

The asymmetry of rotor 40 or of rotor magnet 40' can also be generated by using different magnetic materials or by way of an asymmetry in the magnetization of permanent-magnet rotor magnet 40'.

Asymmetry in the Stator

An asymmetry of stator 20 of FIG. 1 can be achieved, for example, by the fact that at least one of poles 21 to 26 is arranged with a slight rotation, so that it is at an angular distance from at least one of the other stator poles 21 to 26 that is not equal to 60° or to a multiple thereof. Variants are of course possible here as well.

Figure 17:
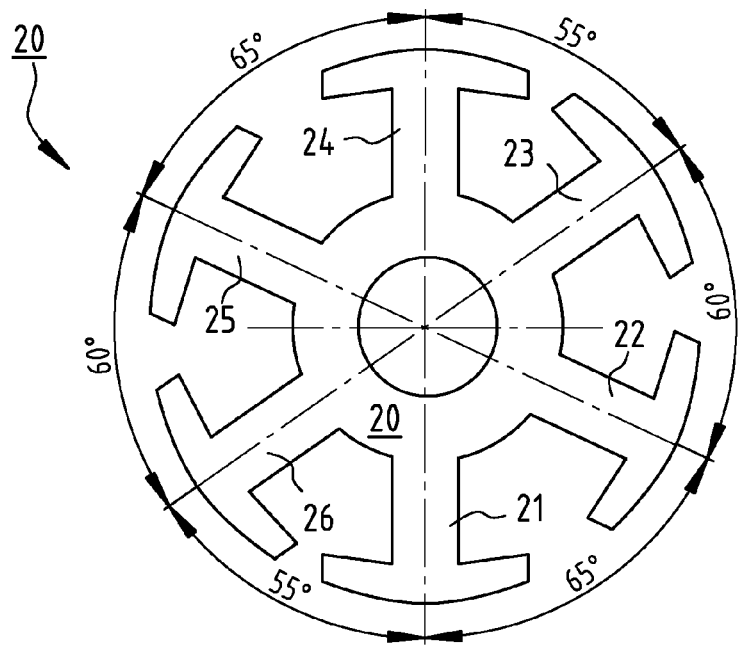
FIG. 17 shows an asymmetrical six-pole stator for motor 10 of FIG. 1.

FIG. 17 shows a stator 20 having six stator poles 21 to 26, of which stator poles 21 and 24 are implemented with a slight clockwise rotation with respect to stator poles 22, 23, 25, 26. The angle between poles 21, 22 and poles 24, 25 is respectively 65°, the angle between poles 22, 23 and poles 25, 26 respectively 60°, and the angle between poles 23, 24 and 26, 21 respectively 55°.

Figure 18:
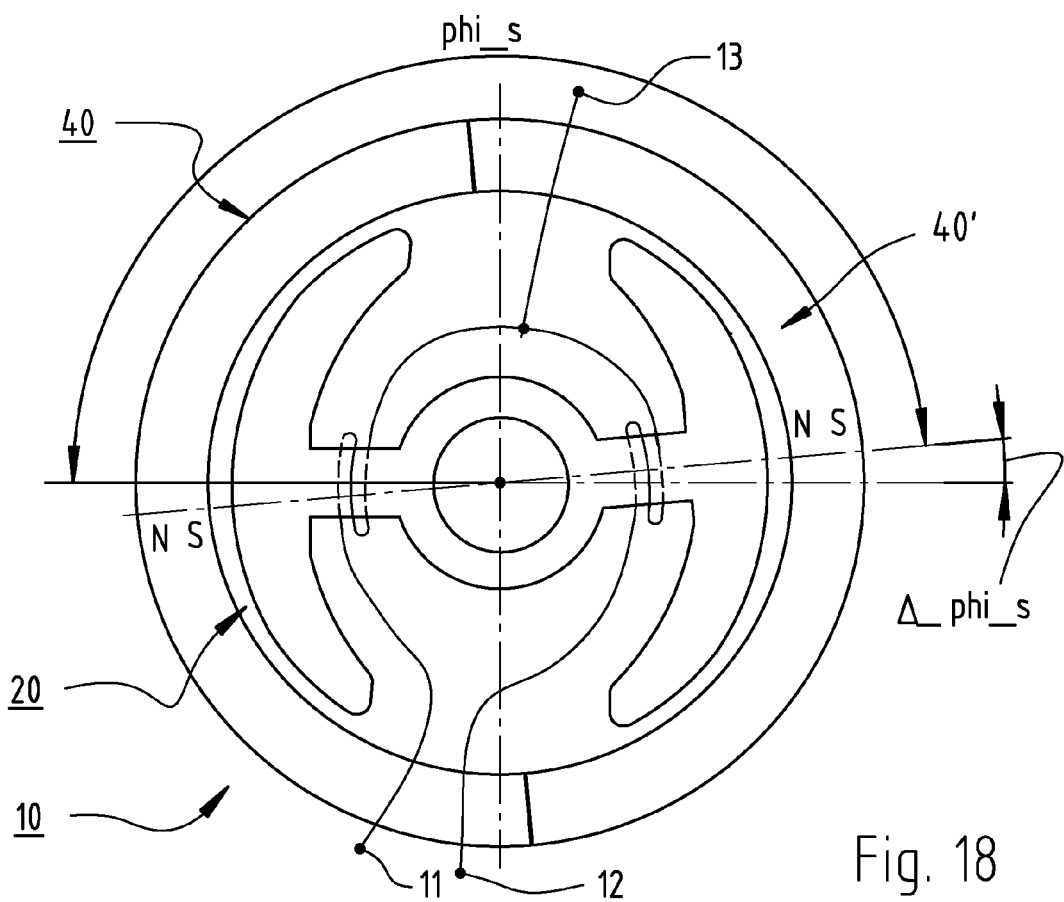
FIG. 18 shows an asymmetrical two-pole stator for motor 10 of FIG. 1.

FIG. 18 shows an asymmetry in a two-pole stator 20. Here the two poles are not arranged exactly at an angular distance phi_s of 180° (360°/S where S=2), but instead, for example, at an angular distance phi_s=175° (or 185°, viewed from the opposite side). The angular offset Delta phi_s with respect to the standard angle 180° is selected to be as small as possible, since it results in somewhat poorer efficiency for motor 10. The asymmetry of stator 20 is especially advantageous with a two-pole motor: with a single-phase two-pole motor, if an asymmetry is provided only in rotor 40, there is still a rotor position in which both coils 31, 32 of the two stator poles 21, 22 simultaneously have a zero crossing, namely when the center of each of rotor poles 41, 42 is located exactly opposite one of stator poles 21, 22.

Advantages Compared with a Single-Phase Motor with Auxiliary Reluctance Torque

With the rotor pole distribution according to FIG. 1 (65°, 60°, 55°, 65°, 60°, 55°) it was found that the voltage constant kE is reduced by approximately two percent as compared with a rotor 40 having symmetrical rotor poles and a symmetrical stator.

This is less of a loss, however, than with a motor having a reluctance notch for generating an auxiliary reluctance torque, i.e. in which the air gap between the stator pole and rotor magnet 40' respectively increases circumferentially in one direction, since the size of the air gap influences the magnetic flux between rotor and stator and thus also the voltage constant kE. The motor according to the present invention can thus supply a higher power output than a corresponding single-phase motor with auxiliary reluctance torque, and the efficiency is better.

The cogging torque of the single-phase motor according to the present invention is considerably reduced as compared with a conventional single-phase motor with auxiliary reluctance torque. This is understandable, since a motor with auxiliary reluctance torque is specifically implemented so that the rotor latches into a rotor position that is suitable for starting. Measurements have indicated a decrease in cogging torque of between 50% and 90% compared with a motor with auxiliary reluctance torque. This has the great advantage that less motor noise is also produced, since a lower cogging torque results in less motor noise.

Single-phase motors whose starting position is defined via an auxiliary reluctance torque require an application in which a large external torque or excessive friction do not occur, i.e. for example a fan application or a motor for a CD player. The single-phase motor according to the present invention makes possible additional applications in which moderate external torques or greater friction can also occur, for example in liquid pumps. The potential utilization range of the motor according to the present invention is thus wider than with a single-phase motor with auxiliary reluctance torque, but narrower than with a three-phase motor.

Advantages Compared with a Three-Phase Motor

The cost advantages of using a single-phase winding arrangement 30 having a third winding terminal 13 and a switch 56 as shown in FIG. 2 are compared, by way of example, with a three-phase motor having a full bridge circuit.

A full bridge circuit for a three-phase motor has three high-side switches (switched to operating voltage) and three low-side switches (switched to ground).

The full bridge circuit for the single-phase motor of FIG. 2, on the other hand, has only two high-side switches 51, 53 and two low-side switches 52, 54. One low-side switch 56 for the third winding terminal is additionally provided. The result is thus on the one hand that one switch, and optionally an associated driver module, are eliminated. In addition, the low-side switch 56 can be a simpler and more economical model with higher internal resistance, since switch 56 is utilized only when starting, and the power loss or heat generation caused by switch 56 is therefore noncritical.

In addition, in a motor having rotor position sensors (e.g. Hall sensors), three rotor position sensors are necessary in the three-phase motor, whereas only one is required in the single-phase motor. Sensorless motor control is nevertheless also possible in both cases.

A calculation with several of the Applicant's high-output fans has shown that a very large cost reduction, on the order of 10%, is possible for the drive system (motor and electronics).

A further advantage of the single-phase motor according to the present invention is that in principle, the stator cores and lamination stacks can be the same as those used with a three-phase motor without auxiliary reluctance torque. The same stamping tool can thus be used for both a three-phase and a single-phase stator, e.g. having a number of stator poles S=6, 12, 18, etc.

It is also possible, however, to select exclusively single-phase variants with S=2, 4, 8, etc.

Comparative Measurements with Different Motor Types

Measurements of cogging torque and of the voltage constant kE, which is proportional to k_M, were carried out. The resulting curves for the voltage constant kE refer in each case to the signal of one coil.

The following motor types were investigated:

| Name | S | R | Height of lamination stack | Outside diameter of lamination stack | Comments |
|---|---|---|---|---|---|
| M231 | 4 | 4 | 14 mm | 54 mm | single-phase, no auxiliary reluctance torque, oblique |
| M232 | 6 | 6 | 14 mm | 54 mm | single-phase, with auxiliary reluctance torque |
| M233 | 6 | 6 | 15 mm | 56 mm | single-phase, with auxiliary reluctance torque |
| M234 | 6 | 4 | 14 mm | 54 mm | three-phase, no auxiliary reluctance torque |

Figure 19:
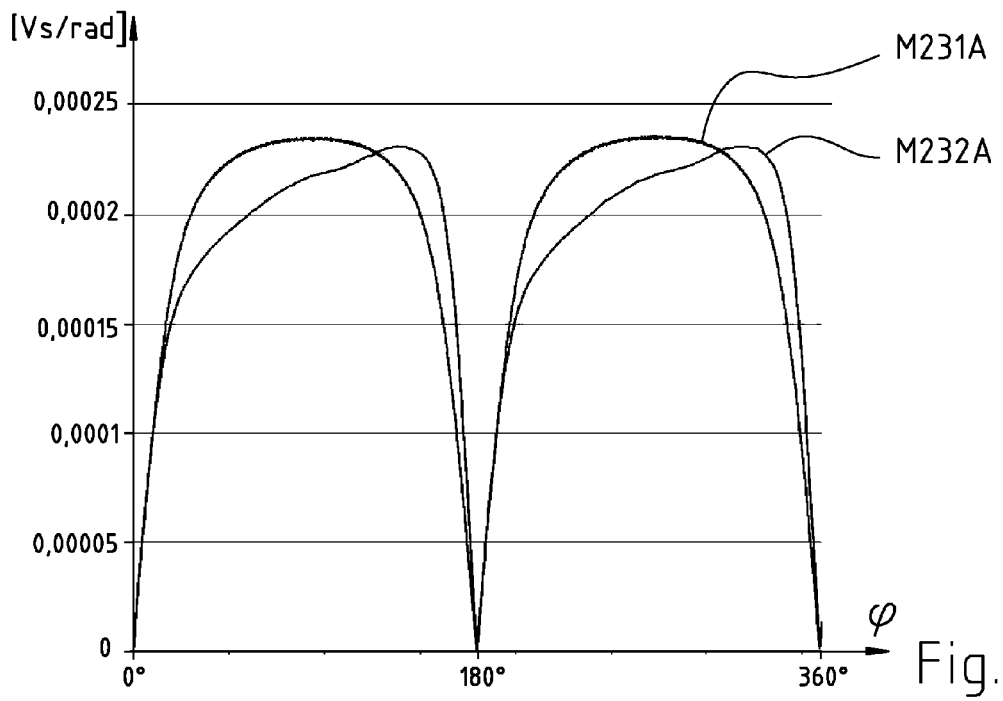
FIG. 19 shows comparative measurements of the voltage constant kE.

FIG. 19 shows the measurement of the voltage constant kE for the M231 and M232 motors, in each case over one revolution of the rotor covering two rotor poles.

Curve M231A shows the voltage constant kE for an M231 motor according to the present invention, which has no auxiliary reluctance torque. Curve M231A is therefore largely symmetrical around an average maximum.

Curve M232A shows the voltage constant kE for a known single-phase motor with auxiliary reluctance torque. It is clearly evident that curve M232A rises in each case from left to right, and reaches its maximum only in the right-hand region.

It was found in this measurement that the area under curve M231A is approximately 3% larger than the area under curve M232A, and this results in slightly higher efficiency.

Curve M231A was measured using a four-slot motor (S=4), and curve M232A using a six-slot motor (S=6). It is presumed that the area under curve M231A would be even larger in percentage terms, relative to the area under curve M232A, if a comparison had been made with a six-slot motor.

Figure 20:
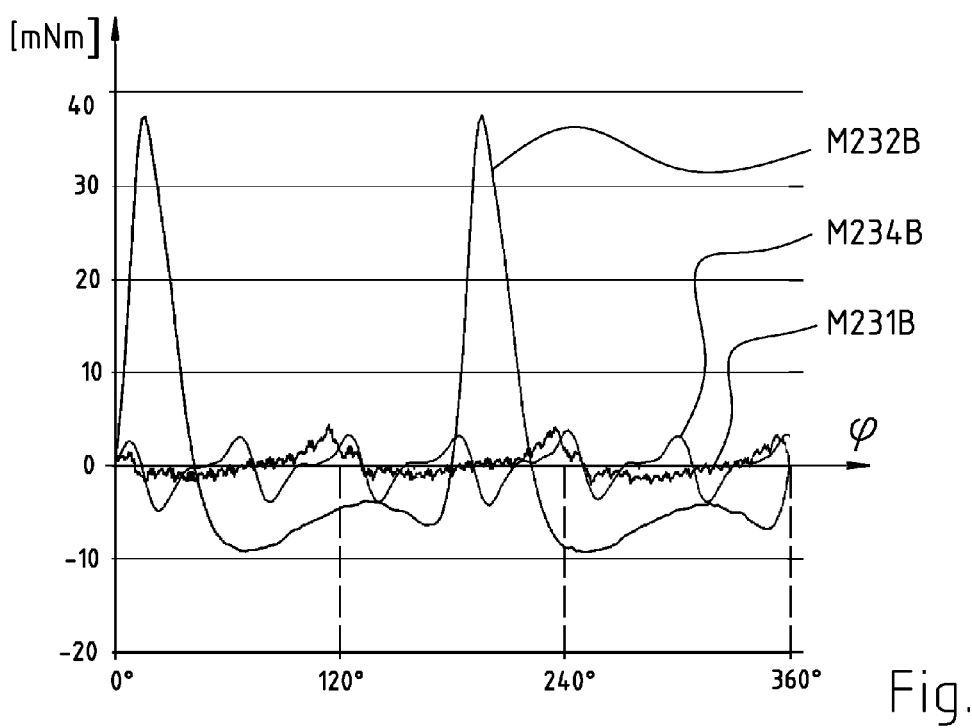
FIG. 20 shows comparative measurements of the cogging torque.

FIG. 20 shows a measurement of the cogging torque for the M231, M232, and M234 motors, in each case over one revolution of the rotor covering two rotor poles.

Curve M232B shows the single-phase M232 motor with auxiliary reluctance torque, and the cogging torque is correspondingly very high. Curve M231B shows the cogging torque for the single-phase M232 motor according to the present invention (here without auxiliary reluctance torque), and the cogging torque is reduced by 87% compared with curve M232B. The jagged profile of curve M231 presumably results from the fact that a different measurement apparatus was used for the measurement.

For comparison, a further curve M234B is plotted which shows the cogging torque of the three-phase M234 motor without auxiliary reluctance torque. The result is that with the M231 motor according to the present invention, corresponding to curve M231B, a cogging torque can be achieved that is appreciably less than that of an existing single-phase motor with auxiliary reluctance torque, and is comparable to the cogging torque of a three-phase motor. This results in an appreciable reduction in noise compared with the known single-phase motor.

Figure 21:
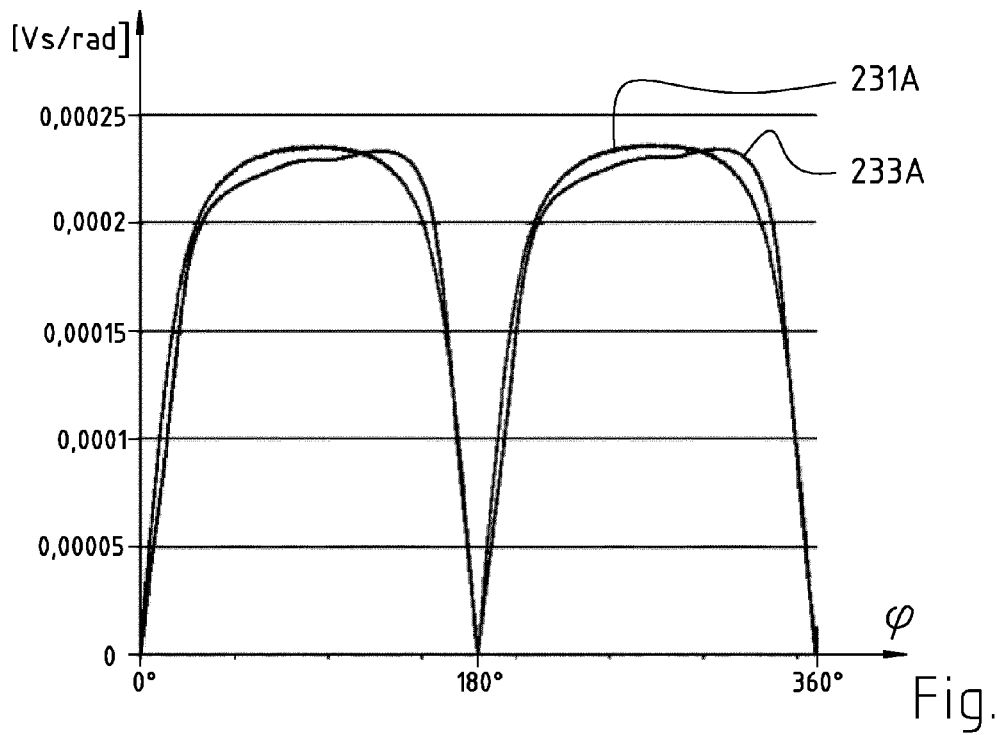
FIG. 21 shows comparative measurements of the voltage constant kE.

FIG. 21 shows a measurement of the voltage constant kE for the M231 and M233 motors, in each case over one revolution of the rotor covering two rotor poles.

Curve M231A shows the voltage constant kE for an M231 motor according to the present invention, which has no auxiliary reluctance torque. Curve M231A is therefore largely symmetrical around an average maximum.

Curve M233A shows the voltage constant kE for the single-phase M233 motor with auxiliary reluctance torque, currently used in large numbers by the Applicant.

The M231 and M233 motors have slightly different outside diameters and a slightly different lamination stack height, but the M233 motor has a smaller end winding and thus a comparable axial height for the overall stator, and the two motors M231, M233 are therefore usable in the same applications.

It is evident from curve M233A that the stator in question has an auxiliary reluctance torque as a result of an air gap that becomes smaller in the circumferential direction, since curve M233A rises in the upper region and reaches a maximum only on the right-hand side.

It was found with this measurement that the area under curve M231A is approximately 1.6% larger than the area under curve M233A, so that the M231 motor according to the present invention has higher efficiency.

Figure 22:
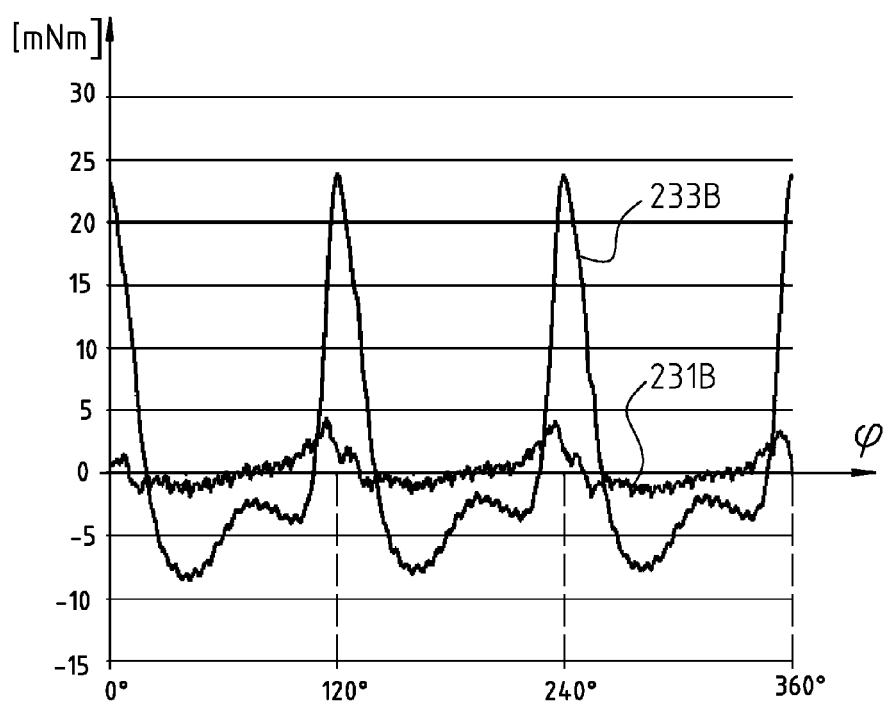
FIG. 22 shows comparative measurements of the cogging torque.

FIG. 22 shows a measurement of cogging torque for the M231, M233 motors. Curve M233B shows the cogging torque of the M233 motor, and curve M231B the cogging torque of the M231 motor according to the present invention.

The M231 motor according to the present invention achieves a reduction in cogging torque of 80.2% with comparable efficiency, and this results in an appreciably quieter motor.

Improving Rotor Position Sensing

Figure 23:
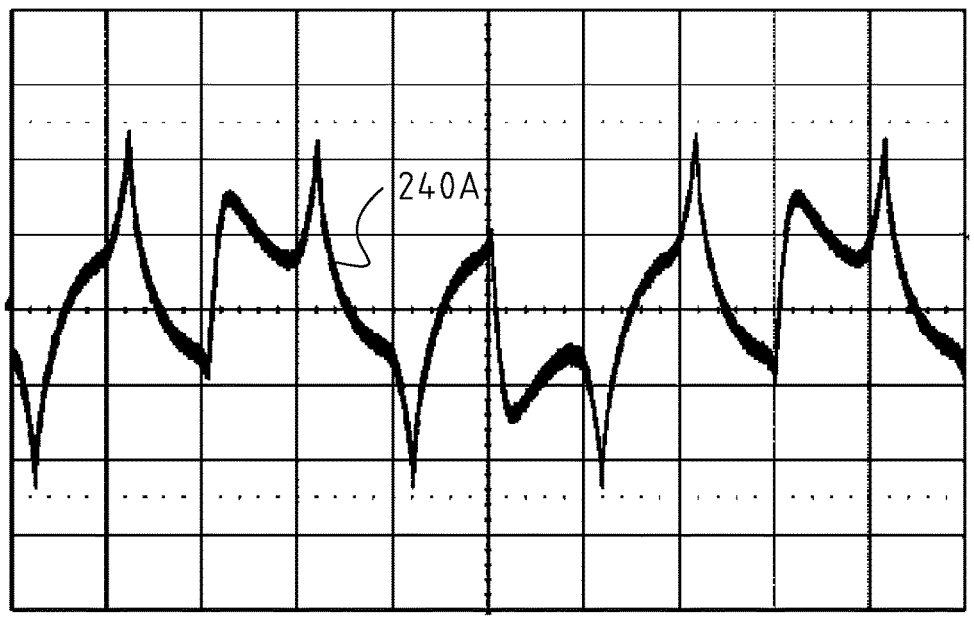
FIG. 23 shows a measurement of the current through the output stage of motor 10 of FIG. 1 with no correction of the rotor position signal.

FIG. 23 shows a measurement of the current through output stage 50 of FIG. 2, measured at base resistor 60. Signal 240A shows the measured current, which is highly irregular; this is attributable to the fact that rotor position sensor 67 (see FIG. 2) ascertains the rotor position based on the asymmetrical rotor poles 41 to 46 of FIG. 1. Depending on whether a rotor pole is presently larger than, smaller than, or corresponds to 360°/R, commutation occurs either too early, too late, or correctly, and the result is that the current often reaches its maximum too early or too late. The motor functions, but efficiency is poor.

An additional, symmetrical magnetic track 48 was therefore provided on rotor 40 of FIG. 16, and arranged relative to rotor position sensor 67 in such a way that the latter can sense the additional magnetic track 48.

Figure 24:
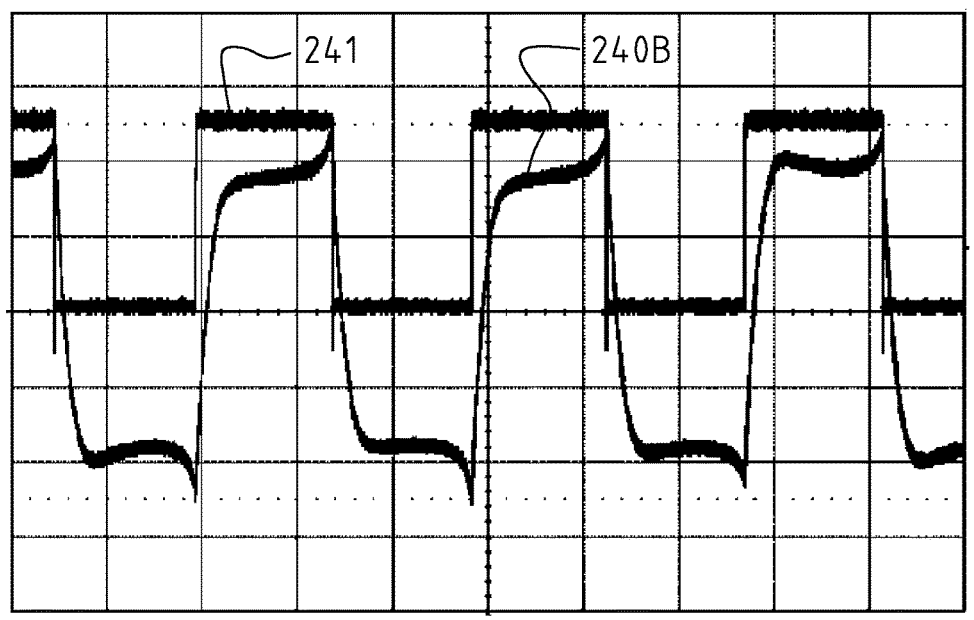
FIG. 24 shows a measurement of the current through the output stage of motor 10 of FIG. 1 with an improved rotor position signal.
Figure 25:
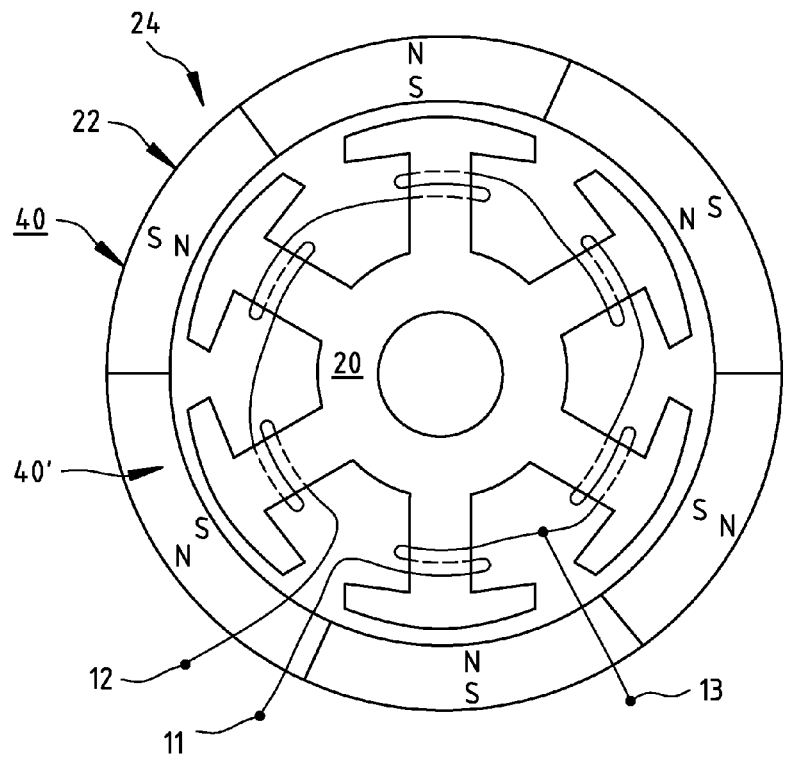
FIG. 25 shows a variant winding pattern of a six-pole stator of motor 10 of FIG. 1.

FIG. 24 shows signal 241 of rotor position sensor 67 of FIG. 2; because of the additional, symmetrical magnetic track 48, this signal is likewise symmetrical. Motor controller 70 can effect commutation on the basis of signal 241, and the current 240B resulting therefrom is appreciably better than the current 240A of FIG. 23. The efficiency of motor 10 is thereby increased.

Alternatively, it is also possible to optimize the commutation effected by control apparatus 70 of FIG. 2 by the fact that it measures, for example at a constant speed, the angular extent of the individual poles, which is proportional to the time between pole changes. Control apparatus 70 can then determine at the present rotation speed, via a timer proceeding from the last pole change, when the next commutation needs to occur.

Overview of Starting Methods

Since a torque can be generated via a current flow through the entire winding arrangement 30, or via a current flow through a first sub-group TG1 (e.g. coils 31, 32 in FIG. 1) and optionally also further sub-groups TG2 (e.g. coils 33 to 36 in FIG. 1), etc. of winding arrangement 30, it is also possible for the motor to start.

Starting Method 1

A simple variant for starting motor 10 consists in moving rotor 40, by means of a first current flow through first sub-group TG1 of winding arrangement 30, into a predetermined first rotor position RS1 relative to first sub-group TG1 of winding arrangement 30 and, proceeding from that rotor position RS1, starting motor 10 by means of a second current flow through the entire winding arrangement 30 or through a second sub-group TG2. When a rotor position sensor 67 is used (see FIG. 2), the direction of the second current flow, and optionally also of the first current flow, is defined preferably as a function of the signal of rotor position sensor 67.

After a successful start, operation can switch over to the normal single-phase mode.

Starting Method 2

A further variant for starting motor 10 consists in, as a function of rotor position or as a function of the signal of rotor position sensor 67, firstly effecting a first current flow through the entire winding arrangement 30 and checking whether the motor has started. If not, effecting a second current flow through first sub-group TG1 of winding arrangement 30 and checking whether motor 10 has started, effecting a third current flow through second sub-group TG2 of winding arrangement 30 and checking whether motor 10 has started, effecting a further current flow through the further sub-groups of winding arrangement 30 and checking whether motor 10 has started.

A successful start can be detected, for example, by the occurrence of changes in the signal of the rotor position sensor. After a successful start, operation can switch over to the normal single-phase mode.

Both the direction of the first current flow through the entire winding arrangement 30 and selection of the first sub-group TG1 (in the case of multiple possible sub-groups) are preferably defined as a function of the signal of rotor position sensor 67 (see FIG. 2).

Figure 27:
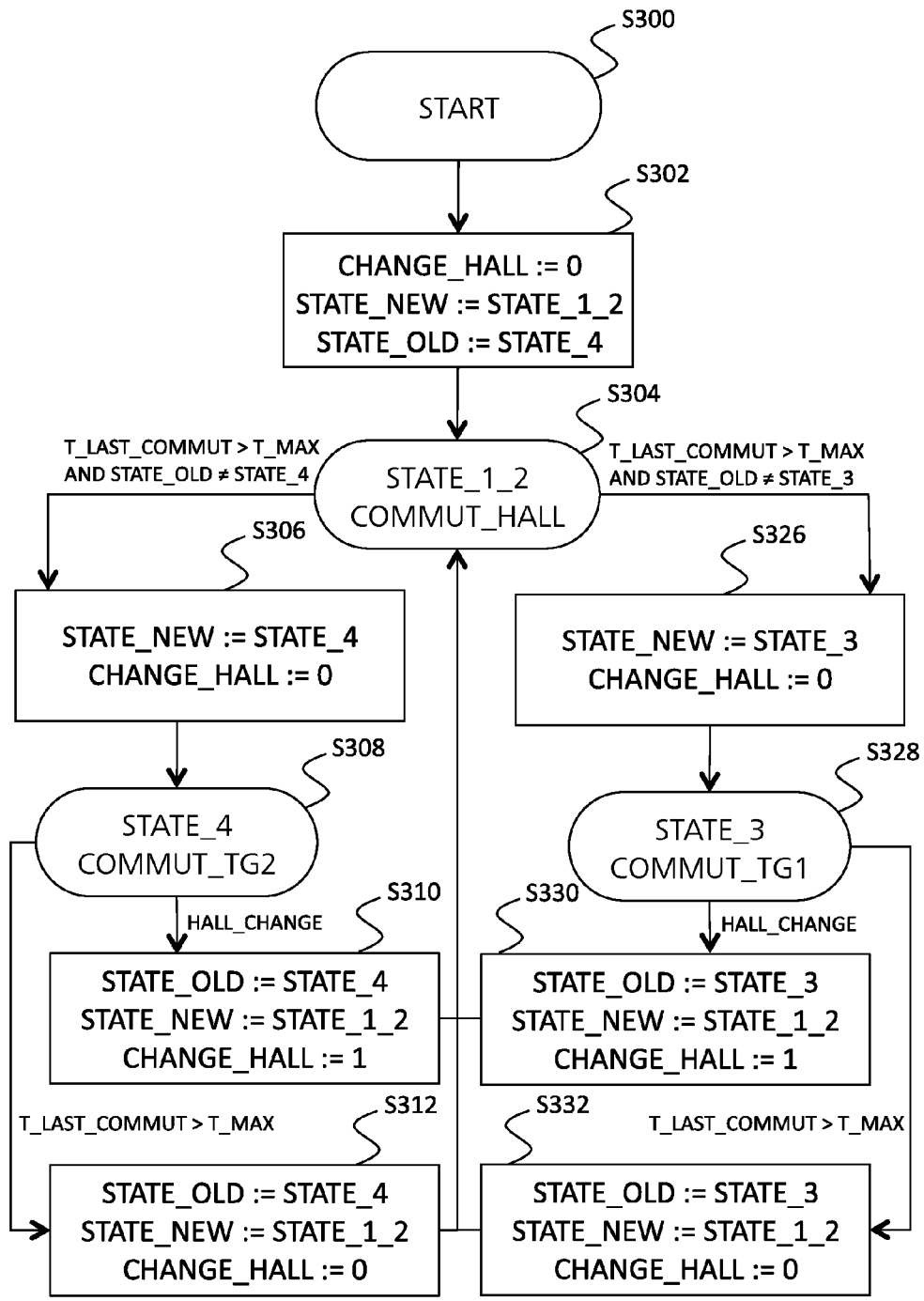
FIG. 27 is a flow chart for a method for starting motor 10 of FIG. 1.

FIG. 27 shows a flow chart for carrying out starting method 2.

The routine begins with step S300, and in S302 the variable CHANGE_HALL is set to zero in order to indicate that no change in the rotor position signal has taken place. The state variable STATE_NEW is set to the value STATE_1_2 in order to indicate that current flow is to occur through the entire winding arrangement 30 via the main winding terminals 11, 12 (see, for example, FIG. 1). A state variable STATE_OLD is set to the value STATE_4 in order to indicate that the most recent current flow was through sub-group TG2; this need not actually have taken place (initialization of variables). Execution then branches to S304, and in this sub-program a commutation (COM-MUT_HALL) is effected via winding terminals 11, 12, i.e. current flow occurs through the entire winding arrangement.

The motor remains in sub-program S304 as long as rotor 40 is rotating and a regular change in the rotor position signals occurs.

After each commutation of the motor, the elapsed time T_LAST_COMMUT since that commutation is measured; and if that time exceeds a maximum elapsed time T_MAX, current flow occurs through either sub-group TG1 or sub-group TG2. For this, the variable STATE_OLD is evaluated, and if it corresponds to the value STATE_4, execution branches to S326. In S326 the variable STATE_NEW is set to the value STATE_3 and the variable CHANGE_HALL to the value zero. Execution then branches to S328, and a current flow through sub-group TG1 occurs in this subroutine, the state being referred to as STATE_3. For the commutation in S328 as well, the elapsed time T_LAST_COMMUT since the last commutation is measured, and if a maximum elapsed time T_MAX is exceeded, execution branches to S332. In S332 the variable STATE_OLD is set to the value STATE_3 in order to indicate that the last state was the state STATE_3. The variable STATE_NEW is set to the value STATE_1_2 and the variable CHANGE_HALL is set to zero, in order to indicate that no change in the rotor position signal has taken place. Execution then branches back to S304.

If a change in the rotor position signal (HALL_CHANGE) has, however, taken place in S328 before the maximum time T_MAX elapses, execution then branches to S330, where the variable STATE_OLD is set to the value STATE_3, the variable STATE_NEW to the value STATE_1_2, and the variable CHANGE_HALL to the value 1, in order to indicate that a change in the rotor position signal has taken place. Execution then branches to S304.

If, conversely, the variable STATE_OLD has the value STATE_3 in S304, then if the maximum elapsed time T_MAX since the last commutation COMMUT_HALL is exceeded, execution branches to S306. In S306 the variable STATE_NEW is set to the value STATE_4, and the variable CHANGE_HALL is set to the value zero. Execution then branches to S308. In the S308 routine the motor is in the STATE_4 state, and a commutation of sub-group TG2 occurs (COMMUT_TG2). The elapsed time T_LAST_COMMUT since the last commutation COMMUT_TG2 is measured, and if a maximum elapsed time T_MAX is exceeded, execution branches to S312. In S312 the variable STATE_OLD is set to the value STATE_4, the variable STATE_NEW to the value STATE_1_2, and the variable CHANGE_HALL to the value zero, and execution branches to S304.

If, on the other hand, a change in the rotor position signal (HALL_CHANGE) has taken place before the maximum time T_MAX has elapsed, execution then branches from S308 to S310, where the variable STATE_OLD is set to the value STATE_4, the variable STATE_NEW to the value STATE_1_2, and the variable CHANGE_HALL to the value 1, and execution branches to S304.

At motor startup, or while it is running, a check is made after every commutation as to whether the next change in the rotor position signal occurs within the maximum elapsed time T_MAX; if not, either a changeover to the state STATE_3 with commutation of sub-group TG1 is carried out, or a changeover to the state STATE_4, in which current flow occurs to sub-group TG2; proceeding from the state STATE_1_2, the state STATE_3 or the state STATE_4 is always selected alternately. Current flow through sub-group TG1 or TG2 causes the rotor to move into a position from which starting can occur via the state STATE_1_2.

Many variations are possible; for example, alternatively to the state STATE_1_2, execution can branch to the state STATE_3 and then to the state STATE_4, until the rotor is turning and execution branches back to the state STATE_1_2 in S304.

Many variants and modifications are of course possible in the context of the present invention.

Instead of a full bridge circuit, for example, it is also possible to use a single bridge circuit that permits a current flow through coil 31, 32, etc. in only one direction; bifilar winding can also be used, in which each of the coils on a stator pole is associated with one current flow direction, so that for S stator poles, a total of 2*S coils are present. It is also possible for only some of the stator poles to be wound.

An auxiliary reluctance torque can additionally be provided, for example so that a starting position from which starting can occur via a current flow between first winding terminal 11 and second winding terminal 12 is reached more often; this auxiliary reluctance torque can be weaker than in the case of a motor that obligatorily relies for starting on a corresponding orientation of the rotor by way of the auxiliary reluctance torque.

What is claimed is:

1. An electric motor that comprises:
   a stator having a number S of stator poles;
   a rotor having a rotor magnet, which rotor magnet has a number R of rotor poles, R being equal to S, and at least one of the rotor and the stator being formed with a magnetic asymmetry;
   a single-phase winding arrangement having a first winding terminal and a second winding terminal, current being capable of flowing through a number W of coils of the winding arrangement via the first winding terminal and the second winding terminal;
   a rotation speed sensor;
   an output stage control circuit that is configured to enable a current between the first winding terminal and the second winding terminal;
   a first apparatus that is configured to enable, in interaction with the output stage control circuit, a current to flow through at least one sub-group of the W coils, the at least one sub-group encompassing at least one of the W coils and fewer than W of the W coils, while disabling current flow through coils that are not in the at least one subgroup,
   said output stage control circuit and first apparatus being configured to:
   with the electric motor in a first state, control the output stage in such a way that current flows through all W coils via the first winding terminal and the second winding terminal;
   with the electric motor in a second state, control the output stage in such a way that current flows through only the at least one sub-group of the W coils, while disabling current flow through the coils that are not in the at least one subgroup;
   sense the rotation speed of the electric motor, and
   perform a switchover from the first state of the electric motor into the second state, whenever the rotation speed of the electric motor is below a predetermined minimum rotation speed.

2. The electric motor according to claim 1, in which the magnetic asymmetry is configured to enable, selectively, at any rotor position of the rotor, the generation of a torque via at least one of the following current-flow processes:
   current flow through all W coils, or
   current flow through the at least one sub-group of the W coils.

3. The electric motor according to claim 2, in which the winding arrangement comprises
   a plurality of mutually parallel sub-strands; and in which the first apparatus comprises a switch that is configured, in a nonconducting state of said switch, to prevent a current through a first portion of the sub-strands but not to prevent a current through the remaining sub-strands.

4. The electric motor according to claim 2, in which at least two sub-groups of the W coils are provided.

5. The electric motor according to claim 1, in which at least two sub-groups of the W coils are provided.

6. The electric motor according to claim 1, wherein
the first apparatus comprises a third winding terminal and a switch, in order to enable, selectively, a current between the first winding terminal or the second winding terminal on the one hand, and the third winding terminal on the other hand.

7. The electric motor according to claim 6, in which the number of coils between the first winding terminal and the third winding terminal is not equal to the number of coils between the third winding terminal and the second winding terminal.

8. The electric motor according to claim 1, in which the rotor exhibits an asymmetry that results from forming the R rotor poles with respective angular extents which are not identical to each other.

9. The electric motor according to claim 1,
in which the rotor exhibits said magnetic asymmetry that results from arranging respective circumferential angular distances between adjacent rotor poles such that
at least one of said angular distances is not equal to 360°/R.

10. The electric motor according to claim 1,
in which the stator exhibits said magnetic asymmetry that results from arranging adjacent stator poles with respective angular distances between them, such that at least one of said distances is not equal to 360°/S, where S=2.

11. The electric motor according to claim 1,
in which the at least one sub-group encompasses at least one of the W coils and at most W−1 coils.

12. The electric motor according to claim 1, in which W=S, that is, the number W of coils equals the number S of stator poles.

13. The electric motor according to claim 1,
wherein the output stage further comprises a full bridge circuit, in order to enable current flow through the winding arrangement between the first winding terminal and the second winding terminal in both directions.

14. The electric motor according to claim 1,
in which the rotor magnet comprises permanent-magnet rotor poles or electromagnetically generated rotor poles; in the case of the electromagnetically generated rotor poles each rotor pole having, associated with it, a winding through which, during operation, current flows.

15. The electric motor of claim 1, which further comprises
a resistor for measuring the current through the output stage control circuit, and wherein the first apparatus is configured to detect an overcurrent.

16. A method for current flow through an electric motor having
a stator having S stator poles,
a rotor having a rotor magnet, which rotor magnet has R rotor poles, R being equal to S;
a single-phase winding arrangement having a first winding terminal and a second winding terminal, W coils being electrically connected between the first winding terminal and the second winding terminal;
an output stage control circuit that is configured to enable a current to flow between the first winding terminal and the second winding terminal;
a first apparatus that is configured to enable, in interaction with the output stage control circuit, a current to flow through at least one sub group of the W coils, the at least one sub group encompassing at least one of the W coils and fewer than W of the W coils; which method comprises the steps of:
with the electric motor in a first state, controlling the output stage in such a way that current flows through all W coils via the first winding terminal and the second winding terminal;
with the electric motor in a second state, controlling the output stage in such a way that current flows through only the at least one sub-group of the W coils, while disabling current flow through the coils that are not in the at least one subgroup;
sensing the rotation speed of the electric motor, and
performing a switchover from the first state of the electric motor into the second state, whenever the rotation speed of the electric motor is below a predetermined minimum rotation speed.

17. The method according to claim 16, further comprising performing, upon starting of the motor, a switchover into the second state upon starting of the motor to achieve a first current flow through a sub-group, and
subsequently performing a switchover into the first state to achieve a second current flow through all W coils.

18. The method according to claim 16, further comprising,
in the first state, predetermining the direction of the current flow between the first winding terminal and the second winding terminal as a function of the rotational position of the rotor.

19. The method according to claim 14, further comprising performing, upon starting of the motor, a switchover into the second state upon starting of the motor to achieve a first current flow through a sub-group, and subsequently performing a switchover into the first state to achieve a second current flow through all W coils.

20. The method according to claim 14, further comprising, in the first state, predetermining the direction of the current flow between the first winding terminal and the second winding terminal as a function of the rotational position of the rotor.

21. An electric motor that comprises:
a stator having a number S of stator poles, the number S being at least 4;
a rotor having a rotor magnet, which rotor magnet has a number R of rotor poles and a number R of pole boundaries, R being equal to S, and the rotor being formed with a magnetic asymmetry that results from arranging respective circumferential angular extents between adjacent rotor poles such that at least one of said extents is not equal to 360°/R, the rotor having a rotational symmetry such that angular pole boundaries along a first half-circumference of the rotor correspond to angular pole boundaries along a second half-circumference of the rotor;
a single-phase winding arrangement having a first winding terminal and a second winding terminal, current being capable of flowing through a number W of coils of the winding arrangement via the first winding terminal and the second winding terminal;
an output stage control circuit that is configured to enable a current between the first winding terminal and the second winding terminal;
a first apparatus that is configured to enable, in interaction with the output stage control circuit, a current flow through at least one subgroup of the W coils, the at least one sub-group encompassing at least one of the W coils and fewer than W of the W coils.

22. The electric motor of claim 21, wherein
the first apparatus is configured to enable, in interaction with the output stage control circuit, a current flow through at least one sub-group of the W coils, the at least one sub-group encompassing two coils, the two coils being located opposite to each other.

23. An electric motor that comprises: a stator having a number S of stator poles;
- a rotor having a rotor magnet, which rotor magnet has a number R of rotor poles, R being equal to S, and at least one of the rotor and the stator being formed with a magnetic asymmetry;
- a single-phase winding arrangement having a first winding terminal and a second winding terminal, current being capable of flowing through a number W of coils of the winding arrangement via the first winding terminal and the second winding terminal;
- a rotor position sensor for providing a rotor position signal for the rotor;

an output stage control circuit that is configured to enable a current between the first winding terminal and the second winding terminal;
- a first apparatus that is configured to enable, selectively, in interaction with the output stage control circuit, at least one first current flow through at least one sub-group of the W coils, the at least one sub-group encompassing at least one of the W coils and fewer than W of the W coils, while disabling a current flow through the coils that are not in the at least one subgroup, or a second current flow through all of said W coils, the first apparatus being configured to choose at least one of said first and second current flows as a function of the rotor position signal.

* * * * *